US011218999B2

(12) United States Patent
Sun et al.

(10) Patent No.: US 11,218,999 B2
(45) Date of Patent: Jan. 4, 2022

(54) METHOD AND APPARATUS FOR SENDING UPLINK CONTROL CHANNEL

(71) Applicant: HUAWEI TECHNOLOGIES CO., LTD., Guangdong (CN)

(72) Inventors: Hao Sun, Beijing (CN); Fan Yang, Beijing (CN); Lixia Xue, Beijing (CN); Jianguo Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 16/811,286

(22) Filed: Mar. 6, 2020

(65) Prior Publication Data
US 2020/0213998 A1    Jul. 2, 2020

Related U.S. Application Data

(63) Continuation of application No. PCT/CN2018/103925, filed on Sep. 4, 2018.

(30) Foreign Application Priority Data

Sep. 8, 2017 (CN) .......................... 201710807583.2

(51) Int. Cl.
*H04W 72/04* (2009.01)
*H04B 1/713* (2011.01)
*H04L 5/00* (2006.01)

(52) U.S. Cl.
CPC ........ *H04W 72/0413* (2013.01); *H04B 1/713* (2013.01); *H04L 5/0048* (2013.01)

(58) Field of Classification Search
CPC . H04L 27/2613; H04L 5/0051; H04L 5/0053; H04L 5/0007; H04L 5/0048;
(Continued)

(56) References Cited

U.S. PATENT DOCUMENTS

2016/0337157 A1* 11/2016 Papasakellariou .... H04L 5/0016
2017/0215201 A1   7/2017 Kim et al.
2018/0359125 A1* 12/2018 Bagheri ................ H04L 5/0051

FOREIGN PATENT DOCUMENTS

| CN | 107040490 A | 8/2017 |
| WO | 2014113971 A1 | 7/2014 |
| WO | 2017026975 A1 | 2/2017 |

OTHER PUBLICATIONS

3GPP TS 38.211 V1.0.0 (Sep. 2017), "3rd Generation Partnership Project; Technical Specification Group Radio Access Network; NR; Physical channels and modulation (Release 15)," Sep. 2017, 37 pages.
(Continued)

*Primary Examiner* — Dady Chery
(74) *Attorney, Agent, or Firm* — Fish & Richardson P.C.

(57) ABSTRACT

Example methods and apparatus for sending an uplink control channel and receiving an uplink control channel are described. One example method for sending an uplink control channel includes determining a resource set to be used for an uplink control channel by a terminal device, where the uplink control channel carries uplink control information and a demodulation reference signal (DMRS). The resource set includes N resource subsets, each of the N resource subsets includes a plurality of consecutive symbols in time domain, and N is greater than or equal to 1. The terminal device determines, for each of the N resource subsets, a quantity of symbols used to carry the DMRS, where the quantity of symbols is one of at least two candidate symbol quantities. The terminal device sends the uplink control channel by using the resource set.

20 Claims, 7 Drawing Sheets

(58) Field of Classification Search
CPC ...... H04L 27/261; H04L 5/00; H04W 72/005; H04W 72/0446; H04W 72/042; H04W 72/0413; H04W 72/04; H04W 76/12; H04B 1/713
See application file for complete search history.

(56) References Cited

OTHER PUBLICATIONS

3GPP TS 38.213 V1.0.0 (Sep. 2017), "3rd Generation Partnership Project; Technical Specification Group Radio Access Network; NR; Physical layer procedures for control (Release 15)," Sep. 2017, 16 pages.

3GPP TS 38.331 V0.0.5 (Aug. 2017), "3rd Generation Partnership Project; Technical Specification Group Radio Access Network; NR; Radio Resource Control (RRC); Protocol specification (Release 15)," Aug. 2017, 38 pages.

CATT, "Further details of long PUCCH for more than two UCI bits," 3GPP TSG RAN WG1 Meeting #90, R1-1712404, Prague, Czechia, Aug. 21-25, 2017, 5 pages.

CMCC, "PUCCH design with long duration," 3GPP TSG RAN WG1 Meeting #90, R1-1713847, Prague, P R. Czechia, Aug. 21-25, 2017, 4 pages.

Ericsson, "On the Design of Long PUCCH for more than 2 bits UCI," 3GPP TSG-RAN WG1 Meeting#90, R1-1714423, Prague, Czech Republic, Aug. 21-25, 2017, 10 pages.

Extended European Search Report issued in European Application No. 18853069.5 dated Jul. 17, 2020, 9 pages.

Lenovo et al., "Discussion on DMRS symbol number determination," 3GPP TSG RAN WG1 Meeting #90, R1-1712681, Prague, Czech Republic, Aug. 21-25, 2017, 3 pages.

LG Electronics, "Design of long NR-PUCCH for more than 2 UCI bits," 3GPP TSG RAN WG1 Meeting #90, R1-1713178, Prague, Czech Republic, Aug. 21-25, 2017, 6 pages.

PCT International Search Report and Written Opinion issued in International Application No. PCT/CN2018/103925 dated Nov. 23, 2018, 13 pages (with English translation).

Vivo, "Discussion on long-PUCCH for UCI more than 2-bit," 3GPP TSG RAN WG1 90 Meeting, R1-1712858, Prague, P.R. Czechia, Aug. 21-25, 2017, 2 pages.

ZTE, "On long-PUCCH for more than 2 bits," 3GPP TSG RAN WG1 Meeting #90, R1-1712452, Prague, Czechia, Aug. 21-25, 2017, 4 pages.

\* cited by examiner

METHOD AND APPARATUS FOR SENDING UPLINK CONTROL CHANNEL

CROSS-REFERENCE TO RELATED APPLICATIONS

This application is a continuation of International Application No. PCT/CN2018/103925, filed on Sep. 4, 2018, which claims priority to Chinese Patent Application No. 201710807583.2, filed on Sep. 8, 2017. The disclosures of the aforementioned applications are hereby incorporated by reference in their entireties.

TECHNICAL FIELD

This application relates to the communications field, and more specifically, to a method and an apparatus for sending an uplink control channel, and a method and an apparatus for receiving an uplink control channel.

BACKGROUND

Currently, an uplink control channel carries uplink control information and a demodulation reference signal (DMRS), and a resource set used to carry the uplink control channel may be divided into a plurality of resource subsets (which may alternatively be referred to as time domain units) in time domain. Each resource subset may include a specified quantity of symbols. In addition, in the prior art, the uplink control channel may correspond to a plurality of formats. For any format, each resource subset includes only one symbol used to carry the DMRS. Further, the uplink control channel may correspond to a plurality of cyclic prefix lengths. For any cyclic prefix length, each resource subset includes only one symbol used to carry the DMRS.

With development of communications technologies, a format or a cyclic prefix length of the uplink control channel may change. For example, a quantity of symbols included in a resource subset in some formats may be greater than a quantity of symbols included in a resource subset in other formats. For another example, a quantity of symbols included in a resource subset in some cyclic prefix lengths may be greater than a quantity of symbols included in a resource subset in other cyclic prefix lengths. If still only one symbol used to carry the DMRS is configured for such a resource subset that includes a relatively large quantity of symbols, the DMRS signal possibly cannot meet a requirement for demodulating the uplink control information, thereby affecting transmission reliability and accuracy of the uplink control channel.

SUMMARY

This application provides a method and an apparatus for sending an uplink control channel, and a method and an apparatus for receiving an uplink control channel, to improve transmission reliability and accuracy of an uplink control channel.

According to a first aspect, a method for sending an uplink control channel is provided, including: determining, by a terminal device, a resource set to be used for an uplink control channel, where the uplink control channel carries uplink control information and a demodulation reference signal DMRS, the resource set includes N resource subsets, each of the N resource subsets includes a plurality of consecutive symbols in time domain, and N is a positive integer greater than or equal to 1; determining, by the terminal device for each of the N resource subsets, a quantity of symbols used to carry the DMRS, where the quantity of symbols of the DMRS is one of at least two candidate symbol quantities; and sending, by the terminal device, the uplink control channel by using the resource set.

Optionally, "determining, by the terminal device for each of the N resource subsets, a quantity of symbols used to carry the DMRS" means: determining, by the terminal device, a target quantity corresponding to an $i^{th}$ resource subset in the N resource subsets, where i is any value in [1, N], and a quantity of symbols used to carry the DMRS in the $i^{th}$ resource subset is the target quantity corresponding to the $i^{th}$ resource subset.

According to the method for sending an uplink control channel in this embodiment of this application, when a specified format and a specified cyclic prefix are used for the uplink control channel, for each resource subset of the resource set for carrying the uplink control channel, at least two candidate symbol quantities can be used. The at least two candidate symbol quantities are possible quantities of symbols used to carry the DMRS in each resource subset. Therefore, in this embodiment of this application, a plurality of symbols used to carry the DMRS can exist in one resource subset, thereby meeting a requirement for demodulating the uplink control information and improving transmission reliability and accuracy of the uplink control channel.

Optionally, a format of the uplink control channel is a first format, a length of a cyclic prefix CP used for the uplink control channel is a first CP length, and the at least two candidate symbol quantities correspond to the first format and the first CP length.

Optionally, the determining, by the terminal device for each of the N resource subsets, a quantity of symbols used to carry the DMRS includes: determining, by the terminal device for each of the N resource subsets based on a payload of the uplink control information, the quantity of symbols used to carry the DMRS.

A quantity of symbols used to carry the DMRS in a resource subset is determined based on a payload of uplink control information carried in the resource subset. This can ensure that the determined symbol quantity can meet a requirement for demodulating the uplink control information carried in the resource subset, thereby further improving transmission reliability and accuracy of the uplink control channel.

Optionally, the candidate symbol quantities include a first candidate quantity and a second candidate quantity, and the first candidate quantity is greater than the second candidate quantity: and the determining, by the terminal device for each of the N resource subsets based on a payload of the uplink control information, the quantity of symbols used to carry the DMRS includes: when the payload of the uplink control information is greater than or equal to a preset first threshold, determining, by the terminal device, that the quantity of symbols used to carry the DMRS in each resource subset is the second candidate quantity.

Optionally, the first threshold is greater than or equal to 20, and the first threshold is less than or equal to 100.

Optionally, the first threshold is any one of the following values: 20, 30, 40, 50, 60, 70, 80, 90, and 100.

The payload of the uplink control information may be a size (for example, a quantity of bits) of the uplink control information.

Optionally, the uplink control information is information without source encoding.

Optionally, the payload of the uplink control information does not include a cyclic redundancy check CRC check bit.

Optionally, the uplink control information is information obtained through source encoding.

Optionally, the payload of the uplink control information includes a cyclic redundancy check CRC check bit.

Optionally, the determining, by the terminal device for each of the N resource subsets based on a payload of the uplink control information, the quantity of symbols used to carry the DMRS includes: determining, by the terminal device based on the payload of the uplink control information and a size of a time domain resource corresponding to the $i^{th}$ resource subset, a quantity of symbols used to carry the DMRS for the $i^{th}$ resource subset, where i is any value in [1, N].

Optionally, the candidate symbol quantities include a first candidate quantity and a second candidate quantity, and the first candidate quantity is greater than the second candidate quantity; and the determining, by the terminal device based on the payload of the uplink control information and a size of a time domain resource corresponding to the $i^{th}$ resource subset, a quantity of symbols used to carry the DMRS for the $i^{th}$ resource subset includes: when the payload of the uplink control information is less than a preset fifth threshold and the size of the time domain resource corresponding to the $i^{th}$ resource subset is less than a preset sixth threshold, determining, by the terminal device, that the quantity of symbols used to carry the DMRS in the $i^{th}$ resource subset is the second candidate quantity; or when the payload of the uplink control information is less than a preset fifth threshold and the size of the time domain resource corresponding to the $i^{th}$ resource subset is greater than or equal to a preset sixth threshold, determining, by the terminal device, that the quantity of symbols used to carry the DMRS in the $i^{th}$ resource subset is the first candidate quantity.

Optionally, the fifth threshold is greater than or equal to 20, and the fifth threshold is less than or equal to 100.

Optionally, the fifth threshold is any one of the following values: 20, 30, 40, 50, 60, 70, 80, 90, and 100.

Optionally, the sixth threshold is 5 or 6.

Optionally, the determining, by the terminal device for each of the N resource subsets, a quantity of symbols used to carry the DMRS includes: determining, by the terminal device based on the payload of the uplink control information and a size of a frequency domain resource corresponding to an $i^{th}$ resource subset in the N resource subsets, a quantity of symbols used to carry the DMRS for the $i^{th}$ resource subset, where i is any value in [1, N].

A quantity of symbols used to carry the DMRS in a resource subset is determined based on a payload of uplink control information carried in the resource subset and a size of a frequency domain resource corresponding to the resource subset. This can ensure that the determined symbol quantity meets a requirement for demodulating the uplink control information carried in the resource subset, thereby further improving transmission reliability and accuracy of the uplink control channel.

Optionally, the size of the frequency domain resource corresponding to the $i^{th}$ resource subset is a quantity of resource blocks RBs corresponding to the $i^{th}$ resource subset in frequency domain.

Optionally, the quantity of resource blocks RBs corresponding to the $i^{th}$ resource subset in frequency domain may be 1 or 2.

Optionally, the size of the frequency domain resource corresponding to the $i^{th}$ resource subset is a quantity of resource elements REs corresponding to the $i^{th}$ resource subset in frequency domain.

Optionally, the size of the frequency domain resource corresponding to the $i^{th}$ resource subset is a quantity of subcarriers corresponding to the $i^{th}$ resource subset in frequency domain.

Optionally, the candidate symbol quantities include a first candidate quantity and a second candidate quantity, and the first candidate quantity is greater than the second candidate quantity; and the determining, by the terminal device based on the payload of the uplink control information and a size of a frequency domain resource corresponding to an $i^{th}$ resource subset in the N resource subsets, a quantity of symbols used to carry the DMRS for the $i^{th}$ resource subset includes: when a ratio of the payload of the uplink control information to the size of the frequency domain resource corresponding to the $i^{th}$ resource subset is greater than or equal to a preset second threshold, determining, by the terminal device, that the quantity of symbols used to carry the DMRS in the $i^{th}$ resource subset is the second candidate quantity.

A quantity of symbols used to carry the DMRS is determined from the candidate symbol quantities based on a correspondence between the payload of the uplink control information and a size of a frequency domain resource corresponding to a resource subset. This can easily implement a process of determining the quantity of symbols used to carry the DMRS, thereby reducing processing load of the terminal device and processing load of a network device.

Optionally, the second threshold is greater than or equal to 20, and the second threshold is less than or equal to 100.

Optionally, the second threshold is any one of the following values: 20, 30, 40, 50, 60, 70, 80, 90, and 100.

Optionally, the determining, by the terminal device based on the payload of the uplink control information and a size of a frequency domain resource corresponding to an $i^{th}$ resource subset in the N resource subsets, a quantity of symbols used to carry the DMRS for the $i^{th}$ resource subset includes: determining, by the terminal device based on the size of the frequency domain resource corresponding to the $i^{th}$ resource subset, the payload of the uplink control information, and a size of a time domain resource corresponding to the $i^{th}$ resource subset, the quantity of symbols used to carry the DMRS for the $i^{th}$ resource subset.

Optionally, the candidate symbol quantities include a first candidate quantity and a second candidate quantity, and the first candidate quantity is greater than the second candidate quantity; and the determining, by the terminal device based on the size of the frequency domain resource corresponding to the $i^{th}$ resource subset, the payload of the uplink control information, and a size of a time domain resource corresponding to the $i^{th}$ resource subset, the quantity of symbols used to carry the DMRS for the $i^{th}$ resource subset includes: when a ratio of the payload of the uplink control information to the size of the frequency domain resource corresponding to the $i^{th}$ resource subset is less than or equal to a preset third threshold, and the size of the time domain resource corresponding to the $i^{th}$ resource subset is less than a preset fourth threshold, determining, by the terminal device, that the quantity of symbols used to carry the DMRS in the $i^{th}$ resource subset is the second candidate quantity; or when a ratio of the payload of the uplink control information to the size of the frequency domain resource corresponding to the $i^{th}$ resource subset is less than or equal to a preset third threshold, and the size of the time domain resource corresponding to the $i^{th}$ resource subset is greater than or equal to a preset fourth threshold, determining, by the terminal device, that the quantity of symbols used to carry the DMRS in the $i^{th}$ resource subset is the first candidate quantity.

A quantity of symbols used to carry the DMRS is determined based on a quantity of symbols included in a resource subset, in addition to the payload of the uplink control information and a size of a frequency domain resource corresponding to the resource subset. This can further reliably ensure that the determined symbol quantity meets a requirement for demodulating uplink control information carried in the resource subset, thereby further improving transmission reliability and accuracy of the uplink control channel.

Optionally, the third threshold is greater than or equal to 20, and the third threshold is less than or equal to 100.

Optionally, the third threshold is any one of the following values: 20, 30, 40, 50, 60, 70, 80, 90, and 100.

Optionally, the fourth threshold is 5 or 6.

Optionally, the size of the time domain resource corresponding to the $i^{th}$ resource subset is a quantity of symbols (or referred to as time domain symbols) included in the $i^{th}$ resource subset.

Optionally, the determining, by the terminal device for each of the N resource subsets, a quantity of symbols used to carry the DMRS includes: receiving, by the terminal device, first indication information, where the first indication information is used to indicate the quantity of symbols used to carry the DMRS in each resource subset, and determining, by the terminal device for each resource subset based on the first indication information, the quantity of symbols used to carry the DMRS; or receiving, by the terminal device, N pieces of second indication information, where the N pieces of second indication information are in a one-to-one correspondence with the N resource subsets, and each piece of second indication information is used to indicate a quantity of symbols used to carry the DMRS in a corresponding resource subset, and determining, by the terminal device for each resource subset based on the second indication information, the quantity of symbols used to carry the DMRS.

The terminal device determines, based on an indication from the network device, a quantity of symbols used to carry the DMRS in a resource subset. This can reduce computation processing load of the terminal device, and can ensure consistency between a quantity, determined by the network device, of symbols used to carry the DMRS in the resource subset and the quantity, determined by the terminal device, of symbols used to carry the DMRS in the resource subset, thereby further improving transmission reliability of the uplink control channel.

Optionally, the candidate symbol quantities include a first candidate quantity and a second candidate quantity, the first candidate quantity is 2, and the second candidate quantity is 1.

Optionally, when the quantity of symbols used to carry the DMRS in the $i^{th}$ resource subset is 1 and the $i^{th}$ resource subset includes M symbols, if M is an odd number, the symbols used to carry the DMRS in the $i^{th}$ resource subset include a $k^{th}$ symbol in the M symbols, where $k=(M+1)/2$; or when the quantity of symbols used to carry the DMRS in the $i^{th}$ resource subset is 1 and the $i^{th}$ resource subset includes M symbols, if M is an even number, the symbols used to carry the DMRS in the $i^{th}$ resource subset include a $k^{th}$ symbol in the M symbols, where $k=M/2\pm1$; or when the quantity of symbols used to carry the DMRS in the $i^{th}$ resource subset is 2 and the $i^{th}$ resource subset includes M symbols, the symbols used to carry the DMRS in the $i^{th}$ resource subset include a second symbol and a second-to-last symbol in the M symbols.

Optionally, one resource subset is one frequency hopping part.

Optionally, one resource subset of the uplink control channel is one frequency hopping part of the uplink control channel, and the resource set to be used for the uplink control channel includes N frequency hopping parts of the uplink control channel.

Optionally, the first format is a long uplink control channel format (Long PUCCH format).

Optionally, a quantity of symbols occupied by the uplink control channel in the long uplink control channel format is greater than or equal to a preset quantity of symbols.

Optionally, the payload (or referred to as a size) of the uplink control information carried in the uplink control channel in the long uplink control channel format is greater than or equal to a preset quantity of bits.

Optionally, when $N\geq2$, any two resource subsets in the N resource subsets do not overlap with each other in time domain.

Optionally, the N resource subsets are in a same slot, or the N resource subsets are in a plurality of (at least two) slots, where the plurality of (at least two) slots may be consecutive slots, or the plurality of (at least two) slots may be nonconsecutive slots.

According to a second aspect, a method for receiving an uplink control channel is provided, including: determining, by a network device, a resource set to be used for an uplink control channel, where the uplink control channel carries uplink control information and a demodulation reference signal DMRS, the resource set includes N resource subsets, each of the N resource subsets includes a plurality of consecutive symbols in time domain, and N is a positive integer greater than or equal to 1; determining, by the network device for each of the N resource subsets, a quantity of symbols used to carry the DMRS, where the quantity of symbols of the DMRS is one of at least two candidate symbol quantities; and receiving, by the network device, the uplink control channel by using the resource set.

Optionally, "determining, by the network device for each of the N resource subsets, a quantity of symbols used to carry the DMRS" means: determining, by the network device, a target quantity corresponding to an $i^{th}$ resource subset in the N resource subsets, where i is any value in [1, N], and a quantity of symbols used to carry the DMRS in the $i^{th}$ resource subset is the target quantity corresponding to the $i^{th}$ resource subset.

According to the method for receiving an uplink control channel in this embodiment of this application, when a specified format and a specified cyclic prefix are used for the uplink control channel, for each resource subset of the resource set for carrying the uplink control channel, at least two candidate symbol quantities can be used. The at least two candidate symbol quantities are possible quantities of symbols used to carry the DMRS in each resource subset. Therefore, in this embodiment of this application, a plurality of symbols used to carry the DMRS can exist in one resource subset, thereby meeting a requirement for demodulating the uplink control information and improving transmission reliability and accuracy of the uplink control channel.

Optionally, a format of the uplink control channel is a first format, a length of a cyclic prefix CP used for the uplink control channel is a first CP length, and the at least two candidate symbol quantities correspond to the first format and the first CP length.

Optionally, the determining, by the network device for each of the N resource subsets, a quantity of symbols used to carry the DMRS includes: determining, by the network device for each of the N resource subsets based on a payload of the uplink control information, the quantity of symbols used to carry the DMRS.

A quantity of symbols used to carry the DMRS in a resource subset is determined based on a payload of uplink control information carried in the resource subset. This can ensure that the determined symbol quantity meets a requirement for demodulating the uplink control information carried in the resource subset, thereby further improving transmission reliability and accuracy of the uplink control channel.

Optionally, the candidate symbol quantities include a first candidate quantity and a second candidate quantity, and the first candidate quantity is greater than the second candidate quantity; and the determining, by the network device for each of the N resource subsets based on a payload of the uplink control information, the quantity of symbols used to carry the DMRS includes: when the payload of the uplink control information is greater than or equal to a preset first threshold, determining, by the network device, that the quantity of symbols used to carry the DMRS in each resource subset is the second candidate quantity.

Optionally, the first threshold is greater than or equal to 20, and the first threshold is less than or equal to 100.

Optionally, the first threshold is any one of the following values: 20, 30, 40, 50, 60, 70, 80, 90, and 100.

The payload of the uplink control information may be a size (for example, a quantity of bits) of the uplink control information.

Optionally, the uplink control information is information without source encoding.

Optionally, the payload of the uplink control information does not include a cyclic redundancy check CRC check bit.

Optionally, the uplink control information is information obtained through source encoding.

Optionally, the payload of the uplink control information includes a cyclic redundancy check CRC check bit.

Optionally, the determining, by the network device for each of the N resource subsets based on a payload of the uplink control information, the quantity of symbols used to carry the DMRS includes: determining, by the network device based on the payload of the uplink control information and a size of a time domain resource corresponding to the $i^{th}$ resource subset, a quantity of symbols used to carry the DMRS for the $i^{th}$ resource subset, where i is any value in [1, N].

Optionally, the candidate symbol quantities include a first candidate quantity and a second candidate quantity, and the first candidate quantity is greater than the second candidate quantity; and the determining, by the network device based on the payload of the uplink control information and a size of a time domain resource corresponding to the $i^{th}$ resource subset, a quantity of symbols used to carry the DMRS for the $i^{th}$ resource subset includes: when the payload of the uplink control information is less than a preset fifth threshold and the size of the time domain resource corresponding to the $i^{th}$ resource subset is less than a preset sixth threshold, determining, by the network device, that the quantity of symbols used to carry the DMRS in the $i^{th}$ resource subset is the second candidate quantity; or when the payload of the uplink control information is less than a preset fifth threshold and the size of the time domain resource corresponding to the $i^{th}$ resource subset is greater than or equal to a preset sixth threshold, determining, by the network device, that the quantity of symbols used to carry the DMRS in the $i^{th}$ resource subset is the first candidate quantity.

Optionally, the fifth threshold is greater than or equal to 20, and the fifth threshold is less than or equal to 100.

Optionally, the fifth threshold is any one of the following values: 20, 30, 40, 50, 60, 70, 80, 90, and 100.

Optionally, the sixth threshold is 5 or 6.

Optionally, the determining, by the network device for each of the N resource subsets, a quantity of symbols used to carry the DMRS includes: determining, by the network device based on the payload of the uplink control information and a size of a frequency domain resource corresponding to an $i^{th}$ resource subset in the N resource subsets, a quantity of symbols used to carry the DMRS for the $i^{th}$ resource subset, where i is any value in [1, N].

A quantity of symbols used to carry the DMRS in a resource subset is determined based on a payload of uplink control information carried in the resource subset and a size of a frequency domain resource corresponding to the resource subset. This can ensure that the determined symbol quantity meets a requirement for demodulating the uplink control information carried in the resource subset, thereby further improving transmission reliability and accuracy of the uplink control channel.

Optionally, the size of the frequency domain resource corresponding to the $i^{th}$ resource subset is a quantity of resource blocks RBs corresponding to the $i^{th}$ resource subset in frequency domain.

Optionally, the quantity of resource blocks RBs corresponding to the $i^{th}$ resource subset in frequency domain may be 1 or 2.

Optionally, the size of the frequency domain resource corresponding to the $i^{th}$ resource subset is a quantity of resource elements REs corresponding to the $i^{th}$ resource subset in frequency domain.

Optionally, the size of the frequency domain resource corresponding to the $i^{th}$ resource subset is a quantity of subcarriers corresponding to the $i^{th}$ resource subset in frequency domain.

Optionally, the candidate symbol quantities include a first candidate quantity and a second candidate quantity, and the first candidate quantity is greater than the second candidate quantity; and the determining, by the network device based on the payload of the uplink control information and a size of a frequency domain resource corresponding to an $i^{th}$ resource subset in the N resource subsets, a quantity of symbols used to carry the DMRS for the $i^{th}$ resource subset includes: when a ratio of the payload of the uplink control information to the size of the frequency domain resource corresponding to the $i^{th}$ resource subset is greater than or equal to a preset second threshold, determining, by the network device, that the quantity of symbols used to carry the DMRS in the $i^{th}$ resource subset is the second candidate quantity.

A quantity of symbols used to carry the DMRS is determined from the candidate symbol quantities based on a correspondence between the payload of the uplink control information and a size of a frequency domain resource corresponding to a resource subset. This can easily implement a process of determining the quantity of symbols used to carry the DMRS, thereby reducing processing load of the network device and processing load of a terminal device Optionally, the second threshold is greater than or equal to 20, and the second threshold is less than or equal to 100.

Optionally, the second threshold is any one of the following values: 20, 30, 40, 50, 60, 70, 80, 90, and 100.

Optionally, the determining, by the network device based on the payload of the uplink control information and a size of a frequency domain resource corresponding to an $i^{th}$ resource subset in the N resource subsets, a quantity of symbols used to carry the DMRS for the $i^{th}$ resource subset includes: determining, by the network device based on the size of the frequency domain resource corresponding to the $i^{th}$ resource subset, the payload of the uplink control information, and a size of a time domain resource corresponding to the $i^{th}$ resource subset, the quantity of symbols used to carry the DMRS for the $i^{th}$ resource subset.

Optionally, the candidate symbol quantities include a first candidate quantity and a second candidate quantity, and the first candidate quantity is greater than the second candidate quantity; and the determining, by the network device based on the size of the frequency domain resource corresponding to the $i^{th}$ resource subset, the payload of the uplink control information, and a size of a time domain resource corresponding to the $i^{th}$ resource subset, the quantity of symbols used to carry the DMRS for the $i^{th}$ resource subset includes: when a ratio of the payload of the uplink control information to the size of the frequency domain resource corresponding to the $i^{th}$ resource subset is less than or equal to a preset third threshold, and the size of the time domain resource corresponding to the $i^{th}$ resource subset is less than a preset fourth threshold, determining, by the network device, that the quantity of symbols used to carry the DMRS in the $i^{th}$ resource subset is the second candidate quantity; or when a ratio of the payload of the uplink control information to the size of the frequency domain resource corresponding to the $i^{th}$ resource subset is less than or equal to a preset third threshold, and the size of the time domain resource corresponding to the $i^{th}$ resource subset is greater than or equal to a preset fourth threshold, determining, by the network device, that the quantity of symbols used to carry the DMRS in the $i^{th}$ resource subset is the first candidate quantity.

A quantity of symbols used to carry the DMRS is determined based on a quantity of symbols included in a resource subset, in addition to the payload of the uplink control information and a size of a frequency domain resource corresponding to the resource subset. This can further reliably ensure that the determined symbol quantity meets a requirement for demodulating uplink control information carried in the resource subset, thereby further improving transmission reliability and accuracy of the uplink control channel.

Optionally, the third threshold is greater than or equal to 20, and the third threshold is less than or equal to 100.

Optionally, the third threshold is any one of the following values: 20, 30, 40, 50, 60, 70, 80, 90, and 100.

Optionally, the fourth threshold is 5 or 6.

Optionally, the size of the time domain resource corresponding to the $i^{th}$ resource subset is a quantity of symbols (or referred to as time domain symbols) included in the $i^{th}$ resource subset.

Optionally, the method further includes: sending, by the network device, first indication information to a terminal device, where the first indication information is used to indicate the quantity of symbols used to carry the DMRS in each resource subset; or sending, by the network device, N pieces of second indication information to a terminal device, where the N pieces of second indication information are in a one-to-one correspondence with the N resource subsets, and each piece of second indication information is used to indicate a quantity of symbols used to carry the DMRS in a corresponding resource subset.

The terminal device determines, based on an indication from the network device, a quantity of symbols used to carry the DMRS in a resource subset. This can reduce computation processing load of the terminal device, and can ensure consistency between a quantity, determined by the network device, of symbols used to carry the DMRS in the resource subset and the quantity, determined by the terminal device, of symbols used to carry the DMRS in the resource subset, thereby further improving transmission reliability of the uplink control channel.

Optionally, the candidate symbol quantities include a first candidate quantity and a second candidate quantity, the first candidate quantity is 2, and the second candidate quantity is 1.

Optionally, when the quantity of symbols used to carry the DMRS in the $i^{th}$ resource subset is 1 and the $i^{th}$ resource subset includes M symbols, if M is an odd number, the symbols used to carry the DMRS in the $i^{th}$ resource subset include a $k^{th}$ symbol in the M symbols, where $k=(M+1)/2$; or when the quantity of symbols used to carry the DMRS in the $i^{th}$ resource subset is 1 and the $i^{th}$ resource subset includes M symbols, if M is an even number, the symbols used to carry the DMRS in the $i^{th}$ resource subset include a $k^{th}$ symbol in the M symbols, where $k=M/2\pm1$; or when the quantity of symbols used to carry the DMRS in the $i^{th}$ resource subset is 2 and the $i^{th}$ resource subset includes M symbols, the symbols used to carry the DMRS in the $i^{th}$ resource subset include a second symbol and a second-to-last symbol in the M symbols.

Optionally, one resource subset is one frequency hopping part.

Optionally, one resource subset of the uplink control channel is one frequency hopping part of the uplink control channel, and the resource set to be used for the uplink control channel includes N frequency hopping parts of the uplink control channel.

Optionally, the first format is a long uplink control channel format (Long PUCCH format).

Optionally, a quantity of symbols occupied by the uplink control channel in the long uplink control channel format is greater than or equal to a preset quantity of symbols.

Optionally, the payload (or referred to as a size) of the uplink control information carried in the uplink control channel in the long uplink control channel format is greater than or equal to a preset quantity of bits.

Optionally, when $N\geq2$, any two resource subsets in the N resource subsets do not overlap with each other in time domain.

Optionally, the N resource subsets are in a same slot, or the N resource subsets are in a plurality of (at least two) slots, where the plurality of (at least two) slots may be consecutive slots, or the plurality of (at least two) slots may be nonconsecutive slots.

According to a third aspect, an apparatus for sending an uplink control channel is provided, including units configured to perform the steps in the first aspect and the implementations of the first aspect.

Optionally, the apparatus includes a chip or a circuit, for example, a chip or a circuit that may be disposed in a communications device (for example, a terminal device).

Optionally, the apparatus is a communications device, for example, a terminal device.

According to a fourth aspect, an apparatus for receiving an uplink control channel is provided, including units configured to perform the steps in the second aspect and the implementations of the second aspect.

Optionally, the apparatus includes a chip or a circuit, for example, a chip or a circuit that may be disposed in a communications device (for example, a network device).

Optionally, the apparatus is a communications device, for example, a network device.

According to a fifth aspect, a communications device is provided, including a memory and a processor. The memory is configured to store a computer program, and the processor is configured to invoke the computer program from the memory and execute the computer program, so that the communications device performs the method according to any one of the first aspect, the second aspect, or the implementations of the first aspect or the second aspect.

According to a sixth aspect, a chip system is provided, including a memory and a processor. The memory is configured to store a computer program, and the processor is configured to invoke the computer program from the memory and execute the computer program, so that a communications device on which the chip system is installed performs the method according to any one of the first aspect, the second aspect, or the implementations of the first aspect or the second aspect.

According to a seventh aspect, a computer program product is provided. The computer program product includes computer program code. When the computer program code is run by a communications unit, a processing unit, a transceiver, or a processor of a communications device (for example, a terminal device or a network device), the communications device is enabled to perform the method according to any one of the first aspect, the second aspect, or the implementations of the first aspect or the second aspect.

According to an eighth aspect, a computer-readable storage medium is provided. The computer-readable storage medium stores a program. The program enables a communications device (for example, a terminal device or a network device) to perform the method according to any one of the first aspect, the second aspect, or the implementations of the first aspect or the second aspect.

When a specified format and a specified cyclic prefix are used for an uplink control channel, for each resource subset of a resource set for carrying the uplink control channel, at least two candidate symbol quantities can be used, so that a plurality of symbols used to carry a DMRS can exist in one resource subset, thereby meeting a requirement for demodulating uplink control information and improving transmission reliability and accuracy of the uplink control channel.

DETAILED DESCRIPTION OF EMBODIMENTS

Figure 1:
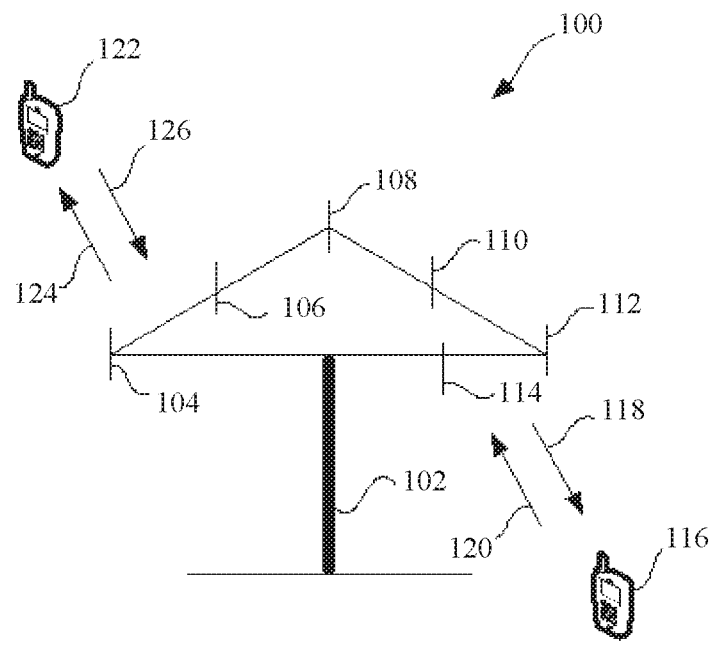
FIG. 1 is a schematic diagram of an example of a communications system according to an embodiment of this application.

The following describes technical solutions of this application with reference to the accompanying drawings.

The technical solutions in embodiments of this application may be applied to various communications systems, for example, a global system for mobile communications (GSM) system, a code division multiple access (CDMA), a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

By way of example but not limitation, in the embodiments of this application, a terminal device may also be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device may be a station (ST) in WLAN, a cellular phone, a cordless phone, a session initiation protocol (SIP) phone, a wireless local loop (WLL) station, a personal digital assistant (PDA) device, a handheld device or a computing device having a wireless communication function, another processing device connected to a wireless modem, a vehicle-mounted device, a wearable device, a terminal device in a next-generation communications system such as a 5G network, a terminal device in a future evolved public land mobile network (PLMN), or the like.

By way of example but not limitation, the terminal device may alternatively be a wearable device in the embodiments of this application. The wearable device may also be referred to as a wearable intelligent device. The wearable intelligent device is a collective name of wearable devices, such as glasses, gloves, watches, clothes, and shoes, obtained by performing intelligent design and development on daily wearables by using a wearable technology. The wearable device is a portable device that is directly put on a human body or is integrated with a user's clothes or ornaments. The wearable device is not merely a hardware device, but further implements a powerful function through software support, data exchange, and cloud-based interaction. In a broad sense, the wearable intelligent device includes a device that provides a complete function, has a large size, and can implement all or some functions without relying on a smartphone, for example, a smartwatch or smart glasses; and includes a device that focuses only on a specific type of application function and needs to be used in combination with another device such as a smartphone, for example, various smart bands and smart jewelry used for vital sign monitoring.

In addition, in the embodiments of this application, the terminal device may alternatively be a terminal device in an internet of things (IoT) system. IoT is an important part during future information technology development, and a major technical feature of IoT is connecting an article to a network by using a communications technology, so as to implement an intelligent network with man-machine interconnection and interconnection between articles.

In the embodiments of this application, the IoT technology can implement massive connection, deep coverage, and power saving of a terminal by using a technology, for example, a narrowband NB technology. For example, NB includes only one resource block (RB), that is, bandwidth of NB is only 180 kB. To implement massive access, terminals need to be discrete in terms of access. According to a communication method in the embodiments of this application, a congestion problem of the IoT technology when massive terminals access a network by using NB can be effectively resolved.

In the embodiments of this application, a network device may be an access network device or a core network device.

The access network device may be a device in an access network that is configured to communicate with a mobile device. The access network device may be an access point (AP) in WLAN, a base transceiver station (BTS) in GSM or CDMA, a NodeB (NB) in WCDMA, a gNB in a new radio (NR) system, an evolved NodeB (eNB or eNodeB) in LTE, a relay station or an access point, a vehicle-mounted device, a wearable device, an access network device in a future 5G network, an access network device in a future evolved PLMN network, or the like.

In addition, in the embodiments of this application, the access network device provides a cell with a service, and the terminal device communicates with the access network device by using a transmission resource (for example, a frequency domain resource, also referred to as a spectrum resource) used for the cell. The cell may be a cell corresponding to the access network device (for example, a base station). The cell may belong to a macro base station, or a base station corresponding to a small cell. The small cell herein may include: a metro cell, a micro cell, a pico cell, a femto cell, or the like. These small cells are characterized by a small coverage area and low transmit power, and are suitable for providing a high-rate data transmission service.

Further, in an LTE system or a 5G system, a plurality of cells may work at a same frequency on a carrier, and it may be considered that a concept of the carrier is equivalent to that of a cell in some special scenarios. For example, in a carrier aggregation (CA) scenario, when a secondary carrier is configured for UE, configuration information carries both a carrier index of the secondary carrier and a cell identity (Cell ID) of a secondary cell working on the secondary carrier. In this case, it may be considered that a concept of a carrier is equivalent to that of a cell. For example, accessing a carrier by UE is equivalent to accessing a cell by the UE.

The core network device max be connected to a plurality of access network devices, to control the access network devices, and may distribute data received from a network side (for example, the Internet) to the access network devices.

The foregoing listed functions and specific implementations of the terminal device, the access network device, and the core network device are merely example descriptions, and are not limited thereto in this application.

In the embodiments of this application, the terminal device or the network device includes a hardware layer, an operating system layer running above the hardware layer, and an application layer running above the operating system layer. The hardware layer includes hardware, such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications, such as a browser, an address book, word processing software, and instant messaging software. In addition, the embodiments of this application do not impose any particular limitation on a specific structure of an executor of the method provided in the embodiments of this application, provided that communication is performed according to the method provided in the embodiments of this application by running a program that records code of the method provided in the embodiments of this application. For example, the method provided in the embodiments of this application may be performed by a terminal device or a network device, or a function module, in a terminal device or a network device, capable of invoking and executing the program.

In addition, various aspects or features in the embodiments of this application may be implemented as a method, an apparatus, or a product that uses standard programming and/or engineering technologies. The term "product" used in this application covers a computer program that can be accessed from any computer-readable device, carrier, or medium. For example, the computer-readable medium may include but is not limited to: a magnetic storage device (for example, a hard disk, a floppy disk, or a magnetic tape), an optical disc (for example, a compact disc (CD) or a digital versatile disc (DVD)), or a smart card or a flash memory device (for example, an erasable programmable read-only memory (EPROM), a card, a stick, or a key drive). In addition, storage media described in this specification may indicate one or more devices and/or other machine-readable media that are configured to store information. The term "machine-readable media" may include but is not limited to: a radio channel, and other media that can store, include, and/or carry an instruction and/or data.

It should be noted that, in the embodiments of this application, a plurality of applications may run at the application layer. In this case, an application program used to perform the communication method in the embodiments of this application may be different from an application program used to control a receive-end device to perform an action corresponding to received data.

FIG. 1 is a schematic diagram of a system 100 to which a communication method according to an embodiment of this application is applicable. As shown in FIG. 1, the system 100 includes an access network device 102. The access network device 102 may include one or more antennas, for example, antennas 104, 106, 108, 110, 112, and 114. In addition, the access network device 102 may additionally include a transmitter chain and a receiver chain. A person of ordinary skill in the art can understand that the transmitter chain and the receiver chain each may include a plurality of components (for example, a processor, a modulator, a multiplexer, a demodulator, a demultiplexer, or an antenna) related to signal sending and receiving.

The access network device 102 may communicate with a plurality of terminal devices (for example, a terminal device 116 and a terminal device 122). However, it can be understood that the access network device 102 may communicate with any quantity of terminal devices similar to the terminal device 116 or the terminal device 122. The terminal device 116 and the terminal device 122 each may be, for example, a cellular phone, a smartphone, a portable computer, a handheld communications device, a handheld computing device, a satellite radio apparatus, a global positioning system, a PDA, and/or any other proper device configured to perform communication in the wireless communications system 100.

As shown in FIG. 1, the terminal device 116 communicates with the antennas 112 and 114. The antennas 112 and 114 send information to the terminal device 116 through a forward link (also referred to as a downlink link) 118, and receive information from the terminal device 116 through a reverse link (also referred to as an uplink link) 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex (FDD) system, different frequency bands may be used for the forward link 118 and the reverse link 120, and different frequency bands may be used for the forward link 124 and the reverse link 126.

For another example, in a time division duplex (TDD) system or a full duplex system, a same frequency band may be used for the forward link 118 and the reverse link 120, and a same frequency band may be used for the forward link 124 and the reverse link 126.

Each antenna (or an antenna group including a plurality of antennas) and/or area designed for communication is referred to as a sector of the access network device 102. For example, an antenna group may be designed to communicate with a terminal device in a sector within a coverage area of the access network device 102. The access network device may send, through a single antenna or through transmit diversity of a plurality of antennas, signals to all terminal devices in a sector corresponding to the access network device. In a process in which the access network device 102 communicates with the terminal device 116 and the terminal device 122 through the forward link 118 and the forward link 124 respectively, a transmit antenna of the access network device 102 may use beamforming to improve a signal-to-noise ratio of the forward link 118 and a signal-to-noise ratio of the forward link 124. In addition, unlike a manner in which the access network device sends signals to all terminal devices of the access network device through a single antenna or through transmit diversity of a plurality of antennas, when the access network device 102 uses beamforming to send signals to the terminal devices 116 and 122 that are randomly distributed in a related coverage area, a mobile device in a neighboring cell suffers less interference.

Within a given time, the access network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits that need to be sent through a channel to the wireless communications receiving apparatus. Such data bits may be included in a transport block (or a plurality of transport blocks) of the data. The transport block may be segmented to generate a plurality of code blocks.

In addition, the communications system 100 may be a PLMN network, a D2D network, an M2M network, an IoT network, or another network. FIG. 1 is only a simplified schematic diagram of an example. The network may further include another access network device not shown in FIG. 1.

The following describes a transmission object (namely, an uplink control channel) in the embodiments of this application in detail.

In the embodiments of this application, an uplink control channel may include uplink control information and a DMRS.

The DMRS is used to demodulate the uplink control information.

By way of example but not limitation, the uplink control information in the embodiments of this application may include but is not limited to one or more of the following information:

1. Feedback Information

In the embodiments of this application, the uplink control information may include feedback information for downlink data.

Specifically, in the embodiments of this application, a feedback technology may be used for transmission of downlink data. By way of example but not limitation, the feedback technology may include, for example, a hybrid automatic repeat request (HARQ) technology.

The HARQ technology is a technology formed by combining forward error correction (FEC) and automatic repeat request (ARQ).

For example, in the HARQ technology, after receiving data from a transmit end, a receive end can determine whether the data can be correctly decoded. If the data cannot be correctly decoded, the receive end can feed back negative acknowledgment (NACK) information to the transmit end, so that the transmit end can determine, based on the NACK information, that the receive end does not accurately receive the data and therefore the transmit end can perform retransmission processing; or if the data can be correctly decoded, the receive end can feed back acknowledgment (ACK) information to the transmit end, so that the transmit end can determine, based on the ACK information, that the receive end has accurately received the data and therefore the transmit end can determine that data transmission has been completed.

In other words, in the embodiments of this application, ACK information can be fed back to the transmit end when decoding succeeds at the receive end, or NACK information can be fed back to the transmit end when decoding fails.

By way of example but not limitation, the uplink control information in the embodiments of this application may include ACK information or NACK information in the HARQ technology.

It should be understood that content included in the foregoing listed feedback information is merely an example description, and this application is not limited thereto. All other information that can indicate a status of receiving downlink data by a terminal device shall fall within the protection scope of this application. For example, the feedback information may further include discontinuous transmission (DTX) information, where the DTX information may be used to indicate that a terminal device has not received downlink data.

2. Channel State Information (CSI)

In the wireless communications field, the CSI is a channel attribute of a communication link. The CSI describes a factor of attenuation of a signal on each transmission path, namely, a value of each element in a channel gain matrix H, for example, information such as signal scattering, environmental fading (multipath fading or shadowing fading), or power decay of distance (power decay of distance). The CSI enables a communications system to adapt to a current channel condition, and ensures high-reliability and high-rate communication in a multi-antenna system.

3. Channel Quality Indicator (CQI) Information

In the embodiments of this application, a CQI may be used to reflect channel quality of a physical downlink shared channel (PDSCH). By way of example but not limitation, in the embodiments of this application, 0 to 15 may be used to represent channel quality of a PDSCH. 0 indicates that the channel quality is the worst, and 15 indicates that the channel quality is the best.

In the embodiments of this application, a terminal device may send CQI information to a network device on a physical uplink control channel (PUCCH) or a physical uplink shared channel (PUSCH). The network device may determine a radio channel condition of a current PDSCH or PUSCH based on the CQI information, and then finish scheduling of the PDSCH. For example, in the embodiments of this application, the network device may determine adaptive modulation and coding (AMC), a modulation and coding scheme (MCS), a bit rate or a data volume of uplink transmission or downlink transmission, or the like, based on the CQI information.

4. Rank Indication (RI) Information

In the embodiments of this application, RI information may be used to indicate a quantity of effective data layers of a PDSCH; or RI information may be used to indicate a quantity of code words (CW) that a terminal device can currently support.

5. Precoding Matrix Indicator (PMI) Information

In the embodiments of this application, PMI information may be used to indicate an index of a codebook set. To be specific, in a multi-antenna technology, for example, a multiple-input multiple-output (MIMO) technology, precoding based on a precoding matrix is performed during baseband processing of a PDSCH physical layer. A terminal device may indicate a precoding matrix by using PMI information, so as to improve signal quality of a PDSCH.

In the embodiments of this application, sending an uplink control channel may be sending data or information that is carried on the uplink control channel, where the data or the information may be data or information obtained through channel encoding.

Figure 2:
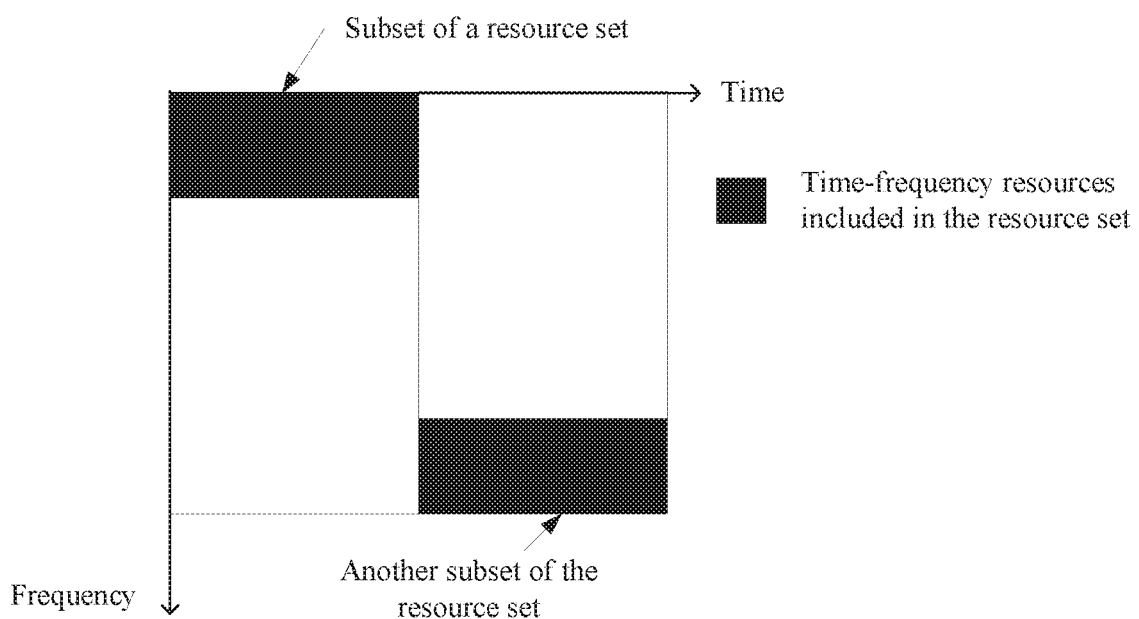
FIG. 2 is a schematic diagram of an example of a resource set according to an embodiment of this application.
Figure 3:
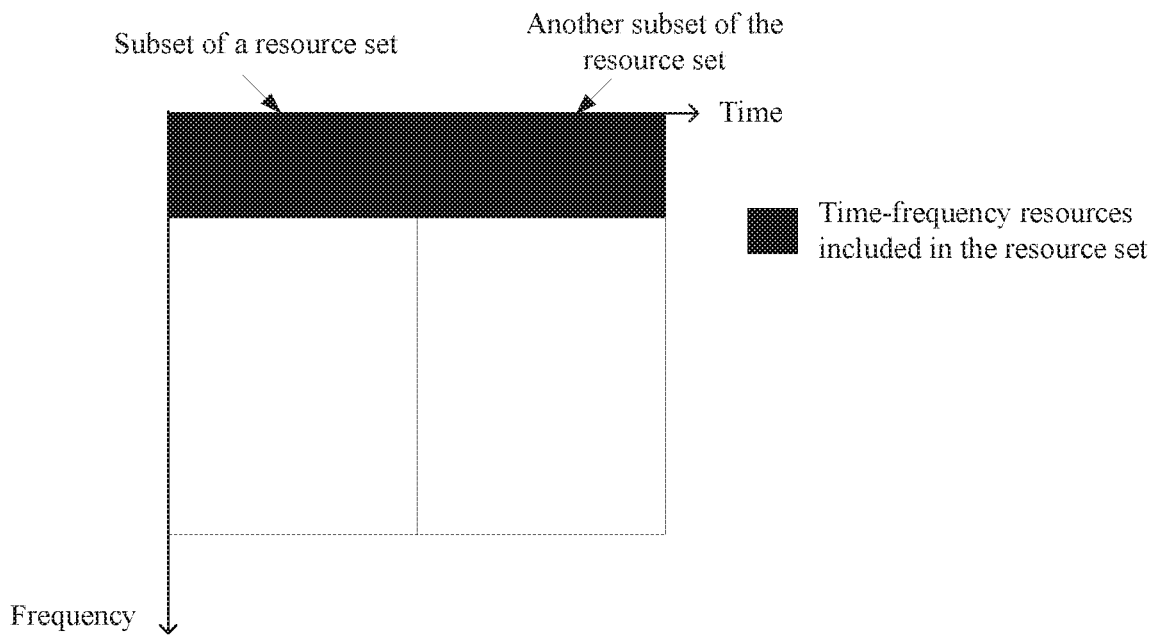
FIG. 3 is a schematic diagram of another example of a resource set according to an embodiment of this application.

The following describes in detail a structure of a resource set according to the embodiments of this application with reference to FIG. 2 and FIG. 3.

As shown in FIG. 2 or FIG. 3, in the embodiments of this application, a resource set may include N subsets (or referred to as "time units" or "time domain units"), where N is a positive integer, for example, N may be any integer greater than or equal to 1.

In addition, in the embodiments of this application, each subset may include at least one symbol.

Optionally, in the N subsets, there may be at least two subsets that include different quantities of symbols.

Optionally, in the N subsets, there may be at least two subsets that include a same quantity of symbols.

Optionally, the N subsets may be consecutive in time domain.

Optionally, the N subsets may not overlap with each other, that is, an intersection of any two subsets in time domain is null.

In the embodiments of this application, a resource set may include one or more resource subsets (referred to as "subsets" for short below for ease of understanding).

In addition, when a resource set includes a plurality of subsets, the plurality of subsets in the resource set may be consecutive or nonconsecutive in time domain (for example, a time interval exists between some subsets adjacent to each other), and this is not particularly limited in this application.

Optionally, for a plurality of consecutive subsets included in each resource set, a time length of each subset is the same.

Alternatively, for a plurality of consecutive subsets included in each resource set, time lengths of at least two subsets are different from each other.

In addition, in the embodiments of this application, in a last process of sending an uplink control channel, for a subset that carries the uplink control channel, the uplink control channel may occupy all symbols in the subset, or may occupy some symbols in the subset, and this is not particularly limited in the embodiments of this application.

Optionally, a plurality of subsets in a resource set may be located in a same slot (slot); or optionally, a plurality of subsets in a resource set may be located in a plurality of slots, where the plurality of slots may be consecutive slots, or the plurality of slots may be nonconsecutive slots, and this is not particularly limited in this application.

Optionally, resource sets adjacent to each other may be consecutive.

Alternatively, a time interval may exist between resource sets adjacent to each other. For example, if the resource sets use a license-free spectrum resource in frequency domain, after a terminal device sends an uplink control channel by using one resource set, whether the license-free spectrum resource is available needs to be evaluated again; therefore, there may be an interval of one or more subsets between resource sets adjacent to each other.

By way of example but not limitation, in the embodiments of this application, a subset of a resource set may be used to transmit an uplink control channel for one terminal device, or may be used to transmit uplink control channels for a plurality of terminal devices, and this is not particularly limited in this application. For example, a plurality of terminal devices served by a same access network device may send uplink control channel data to the access network device by using a subset of a resource set in a manner, such as frequency division multiplexing, time division multiplexing, or spatial division multiplexing.

In the embodiments of this application, each resource set may be divided in advance (or statically or semi-statically configured). In other words, each resource set is divided by a higher-layer management device of a communications system, and notified to each access network device; or a manner of dividing each resource set may be specified in a communication protocol; or a manner of dividing each resource set is pre-stored in each access network device in a manner such as factory defaults or administrator settings. For example, for a same resource, each access network device may use the resource in a time division multiplexing manner, and a specific corresponding range of time of use may be divided by a higher-layer management device.

Alternatively, in the embodiments of this application, each resource set may be independently determined by each access network device (in other words, dynamically-changing).

In the embodiments of this application, all subsets in a resource set may be subsets that include a same quantity of symbols.

For example, a length of each subset of a resource set is P symbols. By way of example but not limitation, a value of P may be any positive integer greater than or equal to 1. By way of example but not limitation, the value of P may be 6 or 7.

Alternatively, optionally, for a plurality of consecutive subsets included in each resource set, time lengths of at least two subsets are different from each other.

In other words, in the embodiments of this application, for all subsets in a resource set, there are at least two subsets that include different quantities of symbols.

For example, a time length of a subset of a resource set may be a quantity of symbols that is any positive integer less than 8. By way of example but not limitation, in the embodiments of this application, one resource set may include two subsets, occupying a total of 14 time domain symbols, where a time length corresponding to each subset is 7 time domain symbols; or one resource element includes two subsets, occupying a total of 13 time domain symbols, where a time length corresponding to a first subset is 7 time domain symbols, and a time length corresponding to a second subset is 6 time domain symbols.

By way of example but not limitation, for example, as shown in FIG. 2, in an embodiment of this application, one subset may be one frequency hopping part (hopping part). In other words, one resource set may include a plurality of frequency hopping parts, or there are at least two subsets occupying different frequency domain resources in one resource set.

Specifically, to improve transmission performance of an uplink control channel, a frequency hopping transmission mode may be used. For example, for an uplink control channel that occupies 2T symbols (that is, a resource set used to carry the uplink control channel includes 2T symbols), first T consecutive time domain symbols (a first subset, or referred to as a first frequency hopping part) of the uplink control channel are transmitted on one frequency domain resource (for example, a frequency domain resource corresponding to one RB), and last T consecutive time domain symbols (a second subset, or referred to as a second frequency hopping part) of the uplink control channel are transmitted on another frequency domain resource (for example, a frequency domain resource corresponding to another RB). A frequency diversity gain can be obtained for the transmission of the uplink control channel in a frequency hopping transmission mode, to improve transmission performance of the uplink control channel.

By way of example but not limitation, when one subset is one frequency hopping part, a frequency domain resource corresponding to the subset may be a frequency domain resource of one or more resource blocks RBs occupied by the frequency hopping part.

For another example, as shown in FIG. 3, in an embodiment of this application, each subset of a resource set occupies a same frequency domain resource.

The following describes in detail a configuration of a symbol (referred to as a DMRS symbol below for ease of understanding) that is used to carry the DMRS and that is in a subset according to the embodiments of this application.

In the embodiments of this application, the DMRS symbol configuration may include two aspects: a quantity of DMRS symbols and a position of a DMRS symbol. The following separately describes content in the two aspects in detail.

A. Quantity of DMRS Symbols

In the embodiments of this application, there may be a plurality of formats (format) for a control channel.

Different uplink control channel formats are defined by using a quantity of OFDM symbols occupied by an uplink control channel and a payload that can be carried by the PUCCH.

For example, if a quantity of uplink control channel symbols occupied by a PUCCH is 1 to 2 symbols and a payload that can be carried by the PUCCH is 1 to 2 bits, a format of the PUCCH is a PUCCH format 0; or if a quantity of uplink control channel symbols occupied by a PUCCH is 1 to 2 symbols and a payload that can be carried by the PUCCH is greater than 2 bits, a format of the PUCCH is a PUCCH format 2; or if a quantity of uplink control channel symbols occupied by a PUCCH is 4 to 14 symbols and a payload that can be carried by the PUCCH is 1 to 2 bits, a format of the PUCCH is a PUCCH format 1; or if a quantity of uplink control channel symbols occupied by a PUCCH is 4 to 14 symbols and a payload that can be carried by the PUCCH is greater than two bits and less than P bits, a format of the PUCCH is a PUCCH format 3; or if a quantity of uplink control channel symbols occupied by a PUCCH is 4 to 14 symbols and a payload that can be carried by the PUCCH is greater than or equal to P bits, a format of the PUCCH is a PUCCH format 4. P may be specified by a communications system or a communication protocol, or P may be preset by a manufacturer or an operator, and this is not particularly limited in this application. In addition, a specific value of P may be freely set according to a requirement, provided that P is greater than 2.

In the embodiments of this application, a same control channel format may correspond to at least two candidate quantities.

A candidate quantity may be a quantity of symbols in a subset that are used to carry the DMRS (namely, DMRS symbols).

In addition, by way of example but not limitation, the candidate symbol quantities may include 1 and 2.

The following gives descriptions generally by using a quantity of DMRS symbols in a subset (denoted as a subset #α) as an example.

Specifically, for a control channel in a format (that is, an example of a first format, such as a long PUCCH format), in a subset #α used to carry the control channel, there may be, for example, one symbol used to carry the DMRS; or there may be, for example, two symbols used to carry the DMRS.

It should be understood that the foregoing listed specific values of the candidate quantity are merely example descriptions, and this application is not limited thereto. A specific value of the candidate quantity may be freely determined or changed according to an actual requirement.

In the embodiments of this application, a plurality of cyclic prefix (Cyclic Prefix, CP) lengths may be used for a control channel.

A CP is formed by moving a signal at the tail of an orthogonal frequency division multiplexing (OFDM) symbol to the head of the OFDM symbol. In other words, a CP is a loop structure formed by duplicating a segment of data at the end of a data symbol to the front of the symbol, to ensure that an OFDM signal with a delay always has an integer multiple period within an FFT integral period.

In the embodiments of this application, the CP may include but is not limited to at least one of the following lengths:

a length of a normal CP 1: a length of a normal CP corresponding to a 15 kHz subcarrier spacing;

a length of a normal CP 2: a length of a normal CP corresponding to a 30 kHz subcarrier spacing;

a length of a normal CP 3: a length of a normal CP corresponding to a 60 kHz subcarrier spacing;

a length of a normal CP 4: a length of a normal CP corresponding to a 120 kHz subcarrier spacing;

a length of a normal CP 5: a length of a normal CP corresponding to a 240 kHz subcarrier spacing;

a length of a normal CP 6: a length of a normal CP corresponding to a 480 kHz subcarrier spacing; and a length of an extended CP 1: a length of an extended CP corresponding to a 60 kHz subcarrier spacing.

In the embodiments of this application, a same CP length may correspond to at least two candidate quantities.

Specifically, for a control channel with a CP length (that is, an example of a first CP length), in a subset #α used to carry the control channel, there may be, for example, one symbol used to carry the DMRS; or there may be, for example, two symbols used to carry the DMRS.

It should be understood that the foregoing listed specific values of the candidate quantity are merely example descriptions, and this application is not limited thereto. A specific value of the candidate quantity may be freely determined or changed according to an actual requirement.

Figure 11:
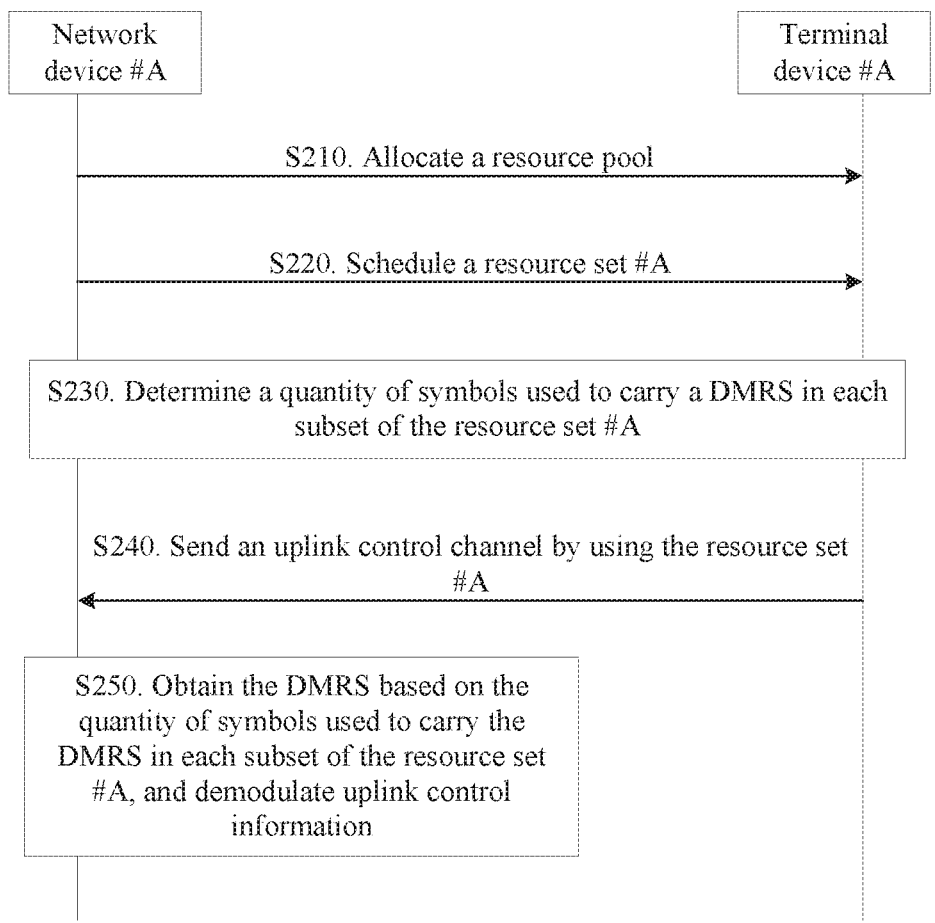
FIG. 11 is a schematic flowchart of a process of transmitting an uplink control channel according to an embodiment of this application.

With reference to a process of transmitting an uplink control channel described in FIG. 11, the following describes in detail a method for and a process of selecting a quantity of DMRS symbols to be actually used from the plurality of candidate quantities during actual transmission.

B. Position of a DMRS Symbol

The following gives descriptions generally by using a position of a DMRS symbol in a subset (for example, the foregoing subset #α) as an example.

In the embodiments of this application, a quantity of DMRS symbols in the subset #α may be any quantity in the foregoing candidate quantities. The following generally describes a position of a DMRS symbol in the subset #α by using an example in which the quantity of DMRS symbols in the subset #α is 1 (namely, a case 1) or 2 (namely, a case 2).

Case 1

It is assumed that the subset #α includes M symbols.

Figure 4:
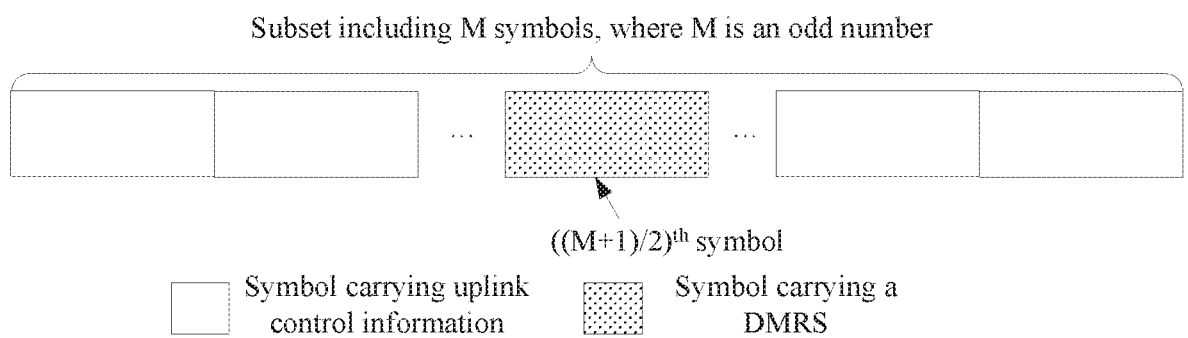
FIG. 4 is a schematic diagram of an example of a resource element according to an embodiment of this application.

When M is an odd number, as shown in FIG. 4, in an embodiment of this application, the DMRS symbol may be an $((M+1)/2)^{th}$ symbol in the M symbols.

Figure 5:
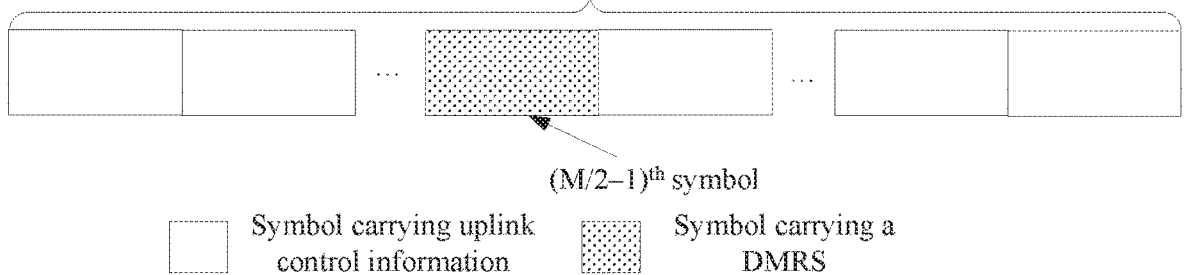
FIG. 5 is a schematic diagram of another example of a resource element according to an embodiment of this application.
Figure 6:
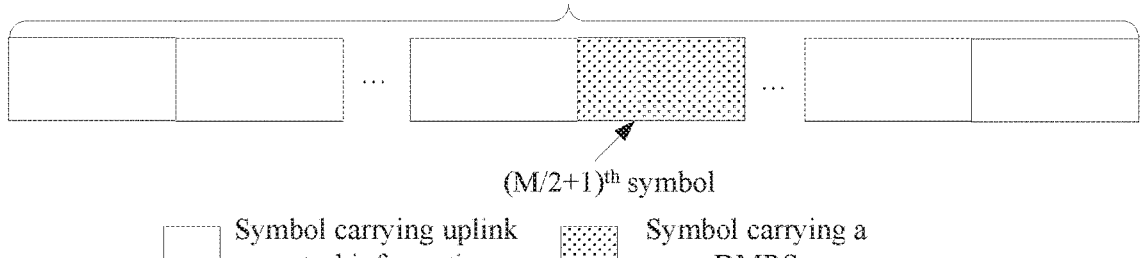
FIG. 6 is a schematic diagram of still another example of a resource element according to an embodiment of this application.

When M is an even number, as shown in FIG. 5, in an embodiment of this application, the DMRS symbol may be an $(M/2-1)^{th}$ symbol in the M symbols; or when M is an even number, as shown in FIG. 6, in an embodiment of this application, the DMRS symbol may be an $(M/2+1)^{th}$ symbol in the M symbols.

It should be understood that the positions, listed in the case 1, of the DMRS symbol are merely example descriptions, and this application is not limited thereto. A position of a DMRS symbol in a subset may be freely arranged according to an actual requirement. For example, in an embodiment of this application, a second symbol or a second-to-last symbol in a subset (for example, the foregoing subset #α) may be used as a DMRS symbol.

Case 2

It is assumed that the subset #α includes M symbols.

Figure 7:
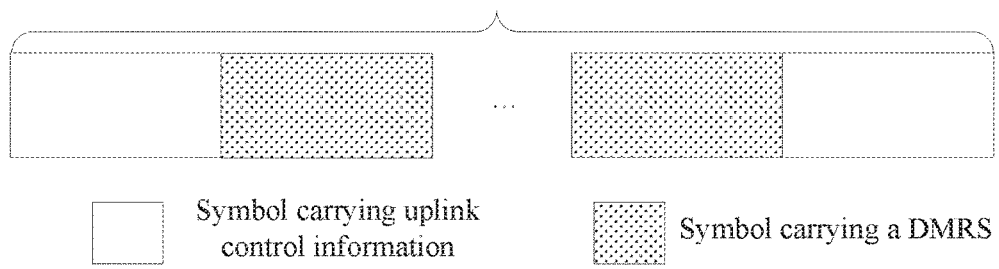
FIG. 7 is a schematic diagram of yet another example of a resource element according to an embodiment of this application.

As shown in FIG. 7, in an embodiment of this application, a second symbol and a second-to-last symbol in the subset #α may be used as DMRS symbols.

Figure 8:
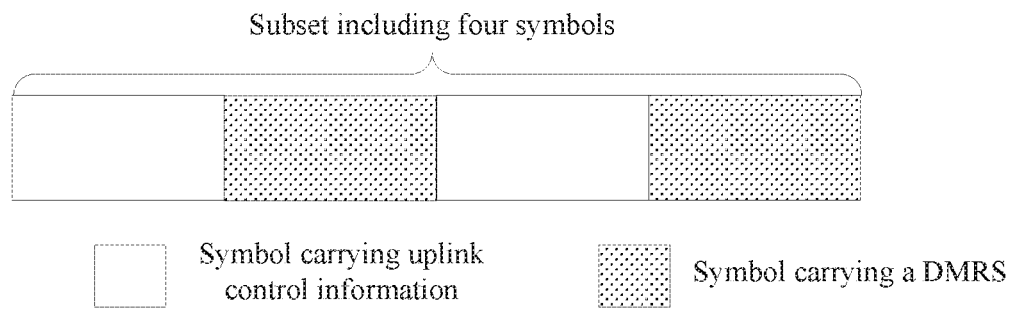
FIG. 8 is a schematic diagram of still yet another example of a resource element according to an embodiment of this application.
Figure 9:
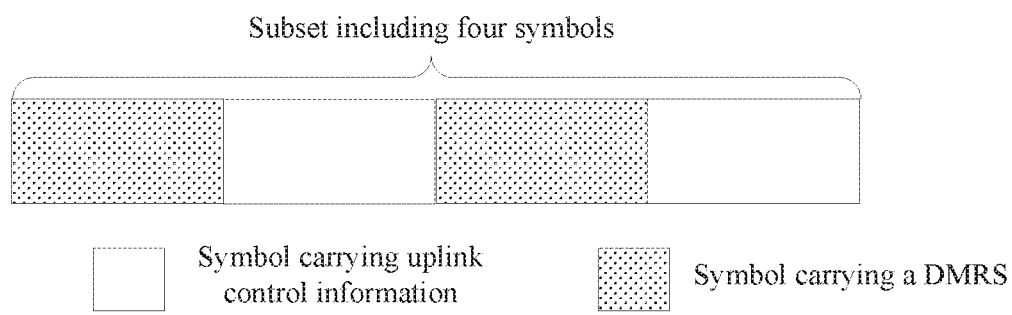
FIG. 9 is a schematic diagram of a further example of a resource element according to an embodiment of this application.
Figure 10:
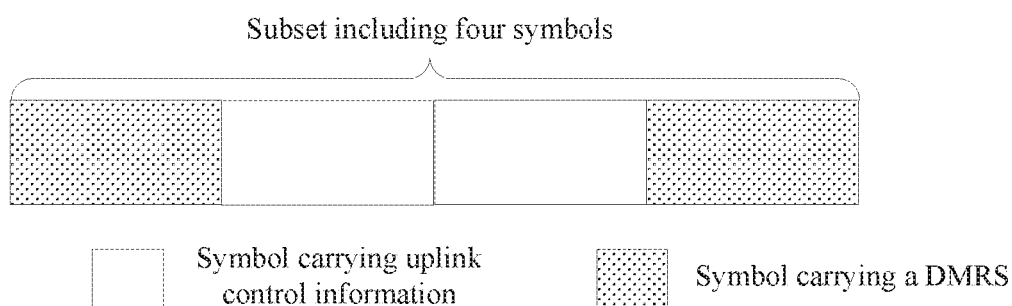
FIG. 10 is a schematic diagram of a still further example of a resource element according to an embodiment of this application.

It should be understood that the positions of the DMRS symbols listed in the case 2 are merely example descriptions, and this application is not limited thereto. A position of a DMRS symbol in a subset may be freely arranged according to an actual requirement. For example, when M=4, a position of a DMRS symbol in a subset may be arranged in any one of manners shown in FIG. 8 to FIG. 10. For example, when M=4, as shown in FIG. 8, DMRS symbols may be a second symbol and a fourth symbol in the M symbols; or when M=4, as shown in FIG. 9, DMRS symbols may be a first symbol and a third symbol in the M symbols; or when M=4, as shown in FIG. 10, DMRS symbols may be a first symbol and a fourth symbol in the M symbols.

For another example, in an embodiment of this application, a first symbol and a last symbol in the subset #α may be used as DMRS symbols. Alternatively, for another example, in an embodiment of this application, two consecutive symbols in middle positions of the subset #α may be used as DMRS symbols.

The following generally describes in detail a method for and a process of transmitting an uplink control channel according to an embodiment of this application, by using a process of transmitting uplink control information # A and a DMRS # A between a terminal device # A (that is, an example of a terminal device) and a network device # A (that is, an example of a network device) as an example, where the DMRS # A is used to demodulate the uplink control information.

As shown in FIG. 11, in S210, after the terminal device # A accesses a network provided by the network device # A, the network device # A may allocate, to the terminal device # A by using, for example, higher layer signaling, a resource pool used to transmit an uplink control channel. The resource pool may include a plurality of resource sets.

It should be noted that subsets included in the plurality of resource sets in the resource pool may be the same or different, and this is not particularly limited in this application.

In S220, the network device # A may allocate, to the terminal device # A from the resource pool, a resource set (denoted as a resource set # A below for ease of understanding and differentiation) used to transmit the uplink control information # A and the DMRS # A.

It should be noted that, when the uplink control information # A includes feedback information, the network device # A may send indication information of the resource set # A to the terminal device # A by using downlink control information (DCI); or when the uplink control information # A includes CSI or a CQI, the network device # A may send indication information of the resource set # A to the terminal device # A by using higher layer signaling.

In addition, by way of example but not limitation, in this embodiment of this application, the indication information of the resource set # A may be an index of the resource set # A in the foregoing resource pool.

As described above, in the embodiments of this application, one subset may correspond to a plurality of candidate quantities. Therefore, in S230, the terminal device # A may determine a quantity (namely, a target quantity) of symbols actually used to carry the DMRS in each subset of the resource set # A, where the target quantity is one of the plurality of candidate quantities.

For ease of understanding and differentiation, the following generally describes a process of S230 in detail by using a quantity (denoted as a target quantity #1 below for ease of understanding and differentiation) of symbols to be actually used to carry the DMRS in a subset #1 of the resource set # A as an example.

By way of example but not limitation, in this embodiment of this application, the terminal device # A may determine the target quantity #1 according to a preset rule (that is, a manner 1), or the network device # A may indicate the target quantity #1 to the terminal device # A (that is, a manner 2). The following describes the two manners in detail.

Manner 1

In this embodiment of this application, the preset rule may include at least one of the following rules depending on different parameters used.

Rule 1

The rule 1 is a rule to determine a target quantity based on a size of the uplink control information.

Specifically, generally, it is assumed that candidate quantities corresponding to the subset #1 include a candidate quantity # a and a candidate quantity # b, where the candidate quantity # a is greater than the candidate quantity # b.

By way of example but not limitation, the candidate quantity # a may be 2, and the candidate quantity # b may be 1.

Generally, it is assumed that a size of the uplink control information # A is X.

The size of the uplink control information # A may be a quantity of bits included in the uplink control information # A.

In addition, in this embodiment of this application, the uplink control information # A may be information without source encoding, that is, the uplink control information # A may not include a cyclic redundancy check (Cyclic Redundancy Check, CRC) bit; or the uplink control information # A may be information source encoding, that is, the uplink control information # A may include a CRC bit, and this is not particularly limited in this application.

The rule may include the following role:

if $X \geq W1$, the terminal device # A may determine the candidate quantity # b as the target quantity #1, where W1 is a preset threshold (that is, an example of a first threshold).

By way of example but not limitation, a value of W1 may be any value greater than 20 and less than or equal to 100. For example, the value of W1 may be any one of the following values: 20, 30, 40, 50, 60, 70, 80, 90, and 100. It should be understood that the foregoing listed value range of W1 is merely an example description, and this application is not limited thereto. The value of W1 may be changed freely according to an actual requirement. In addition, W may be specified by a communications system or a communication protocol, or W1 may be determined by a network device and delivered to a terminal device, and this is not particularly limited in this application.

The following describes a method for and a process of determining, by the terminal device # A, a parameter to be used for determining the target quantity according to the rule 1.

Specifically, in this embodiment of this application, the terminal device # A may determine a size (payload size) of the uplink control information # A. By way of example but not limitation, the size of the uplink control information # A may be a quantity of bits included in the uplink control information # A.

By way of example but not limitation, the terminal device # A receives load indication information from the network device # A, where the load indication information may be used to indicate the size of the uplink control information # A, so that the terminal device # A can determine the size of the uplink control information # A based on the indication from the network device # A.

In addition, by way of example but not limitation, the load indication information and the indication information of the resource set # A may be carried in same signaling.

For example, when the uplink control information # A includes feedback information, the network device # A may send both the indication information of the resource set # A and the load indication information to the terminal device # A by using downlink control information (DCI).

For another example, when the uplink control information # A includes CSI or a CQI, the network device # A may send both the indication information of the resource set # A and the load indication information to the terminal device # A by using higher layer signaling.

Therefore, the terminal device # A can determine the size of the control information # A. Descriptions of a same or similar case are omitted below to avoid repetition.

In this way, the terminal device can determine the target quantity #1 according to the rule 1.

A quantity of symbols used to carry the DMRS in a resource subset is determined based on a payload of uplink control information carried in the resource subset. This can ensure that the determined symbol quantity meets a requirement for demodulating the uplink control information carried in the resource subset, thereby further improving transmission reliability and accuracy of the uplink control channel.

Rule 2

The rule 2 is a rule to determine a target quantity based on a size of the uplink control information and a quantity of symbols included in the subset #1.

Specifically, generally, it is assumed that candidate quantities corresponding to the subset #1 include a candidate quantity # a and a candidate quantity # b, where the candidate quantity # a is greater than the candidate quantity # b.

By way of example but not limitation, the candidate quantity # a may be 2, and the candidate quantity # b may be 1.

In addition, it is assumed that a size of the uplink control information # A is X.

By way of example but not limitation, the size of the uplink control information # A may be a quantity of bits included in the uplink control information # A.

In addition, generally, it is assumed that a quantity of symbols included in the subset #1 is V. Then the rule 2 may include the following rule:

if $X \leq W2$ or $X < W2$ and $V < W3$, the terminal device # A may determine the candidate quantity # b as the target quantity #1; or if $X \leq W2$ or $X < W2$ and $V \geq W3$, the terminal device # A may determine the candidate quantity # a as the target quantity #1, where W2 is a preset threshold (that is, an example of a fifth threshold), and W3 is a preset threshold (that is, an example of a sixth threshold).

By way of example but not limitation, a value of W2 may be any value greater than 20 and less than or equal to 100. For example, the value of W2 may be any one of the following values: 20, 30, 40, 50, 60, 70, 80, 90, and 100. It should be understood that the foregoing listed value range of W2 is merely an example description, and this application is not limited thereto. The value of W2 may be changed freely according to an actual requirement. In addition, W2 may be specified by a communications system or a communication protocol, or W2 may be determined by a network device and delivered to a terminal device, and this is not particularly limited in this application.

In addition, in this embodiment of this application, W2 may be the same as or different from W1, and this is not particularly limited in this application.

By way of example but not limitation, a value of W3 may be 5 or 6. It should be understood that the foregoing listed specific values of W3 are merely example descriptions, and this application is not limited thereto. The value of W3 may be changed freely according to an actual requirement.

In the rule 2, a method for and a process of determining, by the terminal device # A, the size X of the control information # A may be similar to the method and the process described in the rule 1. Herein, a detailed description thereof is omitted to avoid repetition.

In addition, the terminal device # A may determine, based on the indication information of the resource set # A, a configuration of each subset (including the subset #1) of the resource set # A, for example, a size V of a time domain resource corresponding to each subset.

In this way, the terminal device can determine the target quantity #1 according to the rule 2.

Rule 3

The rule 3 is a rule to determine a target quantity based on a size of a frequency domain resource corresponding to the subset #1 and a size of the uplink control information.

Specifically, generally, it is assumed that candidate quantities corresponding to the subset #1 include a candidate quantity # a and a candidate quantity # b, where the candidate quantity # a is greater than the candidate quantity # b.

By way of example but not limitation, the candidate quantity # a may be 2, and the candidate quantity # b may be 1.

Generally, it is assumed that a size of the uplink control information # A is X.

By way of example but not limitation, the size of the uplink control information # A may be a quantity of bits included in the uplink control information # A.

In addition, in this embodiment of this application, the uplink control information # A may be information without source encoding, that is, the uplink control information # A may not include a cyclic redundancy check (CRC) bit; or the uplink control information # A may be information without source encoding, that is, the uplink control information # A may include a CRC bit, and this is not particularly limited in this application.

In addition, generally, it is assumed that the size of the frequency domain resource corresponding to (in other words, occupied by) the subset #1 is denoted as Y Then the rule 3 may include the following rule:

if $Z \geq W4$, the terminal device # A may determine the candidate quantity # b as the target quantity #1, where $Z=X/Y$, and W4 is a preset threshold (that is, an example of a second threshold).

By way of example but not limitation, a value of W4 may be any value greater than 20 and less than or equal to 100. For example, the value of W4 may be any one of the following values: 20, 30, 40, 50, 60, 70, 80, 90, and 100. It should be understood that the foregoing listed value range of W4 is merely an example description, and this application is not limited thereto. The value of W4 may be changed freely according to an actual requirement. In addition, W4 may be specified by a communications system or a communications protocol, or W4 may be determined by a network device and delivered to a terminal device, and this is not particularly limited in this application.

In addition, in this embodiment of this application, W4 may be the same as or different from W1, and this is not particularly limited in this application.

In addition, in this embodiment of this application, W4 may be the same as or different from W2, and this is not particularly limited in this application.

The following describes a method for and a process of determining, by the terminal device # A, a parameter to be used for determining the target quantity according to the rule 3.

Specifically, in this embodiment of this application, the terminal device # A may determine a size (payload size) of the uplink control information # A. By way of example but not limitation, the size of the uplink control information # A may be a quantity of bits included in the uplink control information # A.

By way of example but not limitation, the terminal device # A receives load indication information from the network device # A, where the load indication information may be used to indicate the size of the uplink control information # A, so that the terminal device # A can determine the size of the uplink control information # A based on the indication from the network device # A.

In addition, by way of example but not limitation, the load indication information and the indication information of the resource set # A may be carried in same signaling.

For example, when the uplink control information # A includes feedback information, the network device # A may send both the indication information of the resource set # A and the load indication information to the terminal device # A by using downlink control information (DCI).

For another example, when the uplink control information # A includes CSI or a CQI, the network device # A may send both the indication information of the resource set # A and the load indication information to the terminal device # A by using higher layer signaling.

In addition, as described above, the terminal device # A may determine, based on the indication information of the resource set # A, a configuration of each subset (including the subset #1) of the resource set # A, for example, a size (for example, a quantity of occupied symbols) of a time domain resource corresponding to each subset, or a size (for example, a quantity of occupied RBs) of a frequency domain resource corresponding to each subset in frequency domain.

Therefore, the terminal device # A can determine a size of a frequency domain resource corresponding to the subset #1. Descriptions of a same or similar case are omitted below to avoid repetition.

In this way, the terminal device can determine the target quantity #1 according to the rule 3.

A quantity of symbols used to carry the DMRS in a resource subset is determined based on a payload of uplink control information carried in the resource subset and a size of a frequency domain resource corresponding to the resource subset. This can ensure that the determined symbol quantity meets a requirement for demodulating the uplink control information carried in the resource subset, thereby further improving transmission reliability and accuracy of the uplink control channel.

In addition, a quantity of symbols used to carry the DMRS is determined from the candidate symbol quantities based on a correspondence between a payload of uplink control information carried in a resource subset and a size of a frequency domain resource corresponding to the resource subset. This can easily implement a process of determining the quantity of symbols used to carry the DMRS, thereby reducing processing load of the terminal device and processing load of the network device.

Rule 4

The rule 4 is a rule to determine a target quantity based on a size of a frequency domain resource corresponding to the subset #1, a size of the uplink control information, and a quantity of symbols included in the subset #1.

Specifically, generally, it is assumed that candidate quantities corresponding to the subset #1 include a candidate quantity # a and a candidate quantity # b, where the candidate quantity # a is greater than the candidate quantity # b.

By way of example but not limitation, the candidate quantity # a may be 2, and the candidate quantity # b may be 1.

In addition, it is assumed that a size of the uplink control information # A is X.

By way of example but not limitation, the size of the uplink control information # A mar be a quantity of bits included in the uplink control information # A.

In addition, generally, it is assumed that the size of the frequency domain resource corresponding to (in other words, occupied by) the subset #1 is denoted as Y, and the quantity of symbols included in the subset #1 is V. Then the rule 4 may include the following rule:

if $Z \leq W5$ or $Z<W5$ and $V<W6$, the terminal device # A may determine the candidate quantity # b as the target quantity #1; or if $Z \leq W5$ or $Z<W5$ and $V \geq W6$, the terminal device # A may determine the candidate quantity # a as the target quantity #1, where $Z=X/Y$, W5 is a preset threshold (that is, an example of a third threshold), and W6 is a preset threshold (that is, an example of a fourth threshold).

By way of example but not limitation, a value of W5 may be any value greater than 20 and less than or equal to 100. For example, the value of W5 may be any one of the following values: 20, 30, 40, 50, 60, 70, 80, 90, and 100. It should be understood that the foregoing listed value range of W5 is merely an example description, and this application is not limited thereto. The value of W5 may be changed freely according to an actual requirement. In addition, W5 may be specified by a communications system or a communication protocol, or W5 may be determined by a network device and delivered to a terminal device, and this is not particularly limited in this application.

In addition, in this embodiment of this application, W5 may be the same as or different from W1, and this is not particularly limited in this application.

In addition, in this embodiment of this application, W5 may be the same as or different from W2, and this is not particularly limited in this application.

In addition, in this embodiment of this application, W5 may be the same as or different from W4, and this is not particularly limited in this application.

By way of example but not limitation, a value of W6 may be 5 or 6. It should be understood that the foregoing listed specific values of W6 are merely example descriptions, and this application is not limited thereto. The value of W6 may be changed freely according to an actual requirement.

In addition, in this embodiment of this application, W6 may be the same as or different from W3, and this is not particularly limited in this application.

In the rule 4, a method for and a process of determining, by the terminal device # A, the size X of the control information # A and the size Y of the frequency domain resource corresponding to the subset #1 may be similar to the method and the process described in the rule 3. Herein, a detailed description thereof is omitted to avoid repetition.

In addition, the terminal device # A may determine, based on the indication information of the resource set # A, a configuration of each subset (including the subset #1) of the resource set # A, for example, a size V of a time domain resource corresponding to each subset.

In this way, the terminal device can determine the target quantity #1 according to the rule 4.

It should be noted that, when the target quantity #1 is determined in the manner 1, a rule used by the terminal device # A needs to be consistent with a rule used by the network device # A, so as to ensure that, for a same subnet, a target quantity determined by the network device # A is consistent with a target quantity determined by the terminal device # A.

A quantity of symbols used to carry the DMRS is determined based on a quantity of symbols included in a resource subset, in addition to a payload of uplink control information carried in the resource subset and a size of a frequency domain resource corresponding to the resource subset. This can further reliably ensure that the determined symbol quantity meets a requirement for demodulating the uplink control information carried in the resource subset, thereby further improving transmission reliability and accuracy of the uplink control channel.

Manner 2

The network device # A may determine the target quantity #1 corresponding to the subset #1, and may send indication information of the target quantity #1 (in other words, indication information of a mapping relationship between the subset #1 and the target quantity #1) to the terminal device # A, so that the terminal device # A may determine, based on the indication from the network device, the target quantity #1 corresponding to the subset #1.

It should be noted that, by way of example but not limitation, when determining the target quantity #1 corresponding to the subset ill, the network device # A may use each rule and each parameter described in the foregoing manner 1. A method for and a process of using, by the network device # A, each rule and each parameter described in the foregoing manner 1 may be similar to the method and the process that are performed by the terminal device # A and that are described in the foregoing manner 1. Herein, a detailed description thereof is omitted to avoid repetition.

It should be noted that, in this embodiment of this application, the network device # A may send, by using a piece of information, a target quantity corresponding to each subset (including the subset #1) of the resource set # A to the terminal device # A.

Alternatively, in this embodiment of this application, the network device # A may send, by using a plurality of pieces of information, a target quantity corresponding to each subset of the resource set # A to the terminal device # A separately. Herein, a quantity corresponding to the plurality of pieces of information may be a quantity N of subsets included in the resource set # A, or may be a quantity less than N, and this is not specifically limited but is configured according to an actual condition.

The terminal device determines, based on an indication from the network device, a quantity of symbols used to carry the DMRS in a resource subset. This can reduce computation processing load of the terminal device, and can ensure consistency between a quantity, determined by the network device, of symbols used to carry the DMRS in the resource subset and the quantity, determined by the terminal device, of symbols used to carry the DMRS in the resource subset, thereby further improving transmission reliability of the uplink control channel.

Therefore, in S230, the terminal device # A can determine, in a process similar to the processing process for the subset #1, a target quantity corresponding to each subset of the resource set # A.

It should be noted that, in this embodiment of this application, there may be at least two subsets with a same target quantity in the resource set # A; or in this embodiment of this application, target quantities corresponding to subsets in the resource set # A may all be different; or in this embodiment of this application, target quantities corresponding to subsets in the resource set # A may all be the same. This is not particularly limited in this embodiment of this application.

In addition, in S230, the terminal device # A may determine a position of a symbol used to carry the DMRS in the subset #1.

For example, in this embodiment of this application, the network device # A may send position indication information about a position of a symbol used to carry the DMRS in the subset #1 to the terminal device # A, so that the terminal device # A may determine, based on the indication from the network device, the position of the symbol used to carry the DMRS in the subset #1.

By way of example but not limitation, the position indication information, the load indication information, and the indication information of the resource set # A may all be carried in same signaling.

For another example, in this embodiment of this application, the terminal device # A may determine, according to a preset rule, a position of a symbol used to carry the DMRS (namely, a DMRS symbol) in the subset #1. A method corresponding to the preset rule may be similar to the manner of determining a position of a DMRS symbol as described in the foregoing case 1 or the foregoing case 2. For example, if the target quantity #1 is 1 and the subset #1 includes M symbols, when M is an odd number, a DMRS symbol in the subset #1 may be an $((M+1)/2)^{th}$ symbol in the M symbols; or when M is an even number, a DMRS symbol in the subset #1 may be an $(M/2+1)^{th}$ symbol in the M symbols; or when M is an even number, a DMRS symbol in the subset #1 may be an $(M/2-1)^{th}$ symbol in the M symbols. When the target quantity #1 is 2, a second symbol and a second-to-last symbol in the subset #1 may be used as DMRS symbols.

Similarly, the terminal device # A may determine a position of a DMRS symbol in each subset of the resource set # A.

In S240, the terminal device may send the DMRS # A by using the resource set # A (specifically, each subset of the resource set # A) based on the determined quantity of DMRS symbols in each subset and the determined position of the DMRS symbol in each subset, and send the uplink control information # A by using the resource set # A (specifically, each subset of the resource set # A).

Correspondingly, in S240, the network device # A can receive the uplink control channel (including the uplink control information # A and the DMRS # A) by using the resource set # A.

In S250, the network device # A may obtain the DMRS # A from the uplink control channel based on the quantity of DMRS symbols in each subset of the resource set # A and the position of the DMRS symbol in each subset of the resource set # A.

By way of example but not limitation, in this embodiment of this application, a method for determining, by the network device # A, the quantity of DMRS symbols in each subset may be similar to the method used by the terminal device # A in the foregoing manner 1. Herein, a detailed description thereof is omitted to avoid repetition.

It should be understood that the foregoing listed process in which the network device # A can obtain the DMRS # A from the uplink control channel based on the quantity of DMRS symbols in each subset of the resource set # A and the position of the DMRS symbol in each subset of the resource set # A is merely an example description, and this is not particularly limited in this application, provided that it can be ensured that the quantity of DMRS symbols in each subset and the position of the DMRS symbol in each subset determined by the network device # A are consistent with those determined by the terminal device # A.

In addition, the network device # A may demodulate the uplink control information # A based on the DMRS # A. In this embodiment of this application, a method for and a process of the demodulation may be similar to the prior art. Herein, a detailed description thereof is omitted to avoid repetition.

In this way, a process of transmitting the uplink control channel is completed.

According to the method for sending an uplink control channel in this embodiment of this application, when a specified format and a specified cyclic prefix are used for the uplink control channel, for each resource subset of the resource set for carrying the uplink control channel, at least two candidate symbol quantities can be used. The at least two candidate symbol quantities are possible quantities of symbols used to carry the DMRS in each resource subset. Therefore, in this embodiment of this application, a plurality of symbols used to carry the DMRS can exist in one resource subset, thereby meeting a requirement for demodulating the uplink control information and improving transmission reliability and accuracy of the uplink control channel.

Figure 12:
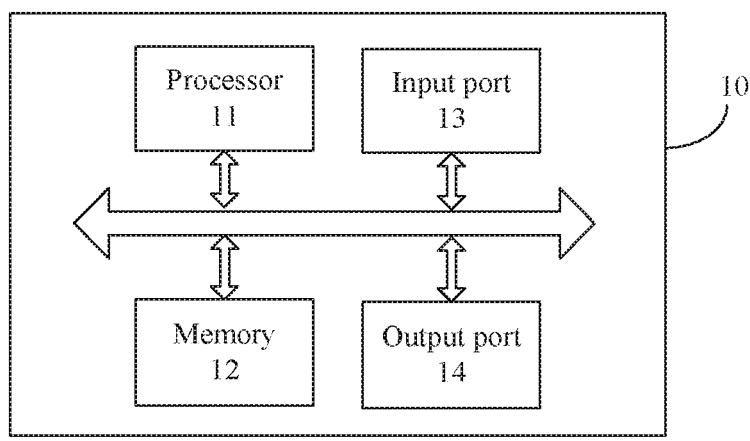
FIG. 12 is a schematic block diagram of an apparatus for sending an uplink control channel according to an embodiment of this application.

According to the foregoing method, FIG. 12 is a schematic diagram 1 of an apparatus 10 for sending an uplink control channel according to an embodiment of this application. As shown in FIG. 12, the apparatus 10 may be a terminal device (for example, the terminal device # A), or may be a chip or a circuit, for example, a chip or a circuit that may be disposed in a terminal device. The terminal device may correspond to the terminal device # A in the foregoing method.

The apparatus 10 may include a processor 11 (that is, an example of a processing unit) and a memory 12. The memory 12 is configured to store an instruction. The processor 11 is configured to execute the instruction stored in the memory 12, so that the apparatus 20 implements the steps performed by the terminal device (for example, the terminal device # A) in the corresponding method in FIG. 11.

Further the apparatus 10 may include an input interface 13 (that is, an example of a communications unit) and an output port 14 (that is, another example of a communications unit). Further, the processor 11, the memory 12, the input port 13, and the output port 14 may communicate with each other through an internal connection channel, to transmit a control signal and/or a data signal. The memory 12 is configured to store a computer program. The processor 11 may be configured to invoke the computer program from the memory 12 and run the computer program, so as to determine a resource set to be used for an uplink control channel and determine, for each of N resource subsets included in the resource set, a quantity of symbols used to carry a DMRS, where the quantity of symbols is one of at least two candidate symbol quantities; and control the output port 14 to send the uplink control channel by using the resource set, thereby completing the steps performed by the terminal device in the foregoing method. The memory 12 may be integrated in the processor 11, or may be separated from the processor 11.

Optionally, if the apparatus 10 is a terminal device, the input port 13 is a receiver and the output port 14 is a transmitter. The receiver and the transmitter may be a same physical entity or different physical entities. When the receiver and the transmitter are a same physical entity, they may be collectively referred to as a transceiver.

Optionally, if the apparatus 10 is a chip or a circuit, the input port 13 is an input interface, and the output port 14 is an output interface.

In an implementation, functions of the input port 13 and the output port 14 may be implemented by using a transceiver circuit or a special-purpose transceiver chip. The processor 11 may be implemented by using a special-purpose processing chip, a special-purpose processing circuit, a special-purpose processor, or a general-purpose chip.

In another implementation, the terminal device provided in this embodiment of this application may be implemented by using a general-purpose computer. To be specific, the memory 12 stores program code for implementing functions of the processor 11, the input port 13, and the output port 14, and the general-purpose processor executes the code in the memory 12 to implement the functions of the processor 11, the input port 13, and the output port 14.

Optionally, the processor 11 is specifically configured to determine, based on a payload of the uplink control information and a size of a frequency domain resource corresponding to an $i^{th}$ resource subset in the N resource subsets, a quantity of symbols used to carry the DMRS for the $i^{th}$ resource subset, where i is any value in [1, N].

Optionally, the processor 11 is specifically configured to: when a ratio of the payload of the uplink control information to the size of the frequency domain resource corresponding to the $i^{th}$ resource subset is greater than or equal to a preset second threshold, determine a second candidate quantity as the quantity of symbols used to carry the DMRS in the $i^{th}$ resource subset.

Optionally, the second threshold is greater than or equal to 20, and the second threshold is less than or equal to 100.

Optionally, the processor 11 is specifically configured to determine, based on the size of the frequency domain resource corresponding to the $i^{th}$ resource subset, the payload of the uplink control information, and a size of a time domain resource corresponding to the $i^{th}$ resource subset, the quantity of symbols used to carry the DMRS for the $i^{th}$ resource subset.

Optionally, the processor 11 is specifically configured to: when a ratio of the payload of the uplink control information to the size of the frequency domain resource corresponding to the $i^{th}$ resource subset is less than or equal to a preset third threshold, and the size of the time domain resource corresponding to the $i^{th}$ resource subset is less than a preset fourth threshold, determine a second candidate quantity as the quantity of symbols used to carry the DMRS in the $i^{th}$ resource subset; or the processor 11 is specifically configured to: when a ratio of the payload of the uplink control information to the size of the frequency domain resource corresponding to the $i^{th}$ resource subset is less than or equal to a preset third threshold, and the size of the time domain resource corresponding to the $i^{th}$ resource subset is greater than or equal to a preset fourth threshold, determine a first candidate quantity as the quantity of symbols used to carry the DMRS in the $i^{th}$ resource subset.

Optionally, the third threshold is greater than or equal to 20, and the third threshold is less than or equal to 100.

Optionally, the fourth threshold is 5 or 6.

Optionally, the input port 13 is configured to receive first indication information, where the first indication information is used to indicate the quantity of symbols used to carry the DMRS in each resource subset.

The processor 11 is specifically configured to determine, for each resource subset based on the first indication information, the quantity of symbols used to carry the DMRS.

Optionally, one resource subset is one frequency hopping part.

Optionally, when the quantity of symbols used to carry the DMRS in the $i^{th}$ resource subset is 1 and the $i^{th}$ resource subset includes M symbols, if M is an odd number, the symbols used to carry the DMRS in the $i^{th}$ resource subset include a $k^{th}$ symbol in the M symbols, where k=(M+1)/2; or when the quantity of symbols used to carry the DMRS in the $i^{th}$ resource subset is 1 and the $i^{th}$ resource subset includes M symbols, if M is an even number, the symbols used to carry the DMRS in the $i^{th}$ resource subset include a $k^{th}$ symbol in the M symbols, where k=M/2±1; or when the quantity of symbols used to carry the DMRS in the $i^{th}$ resource subset is 2 and the $i^{th}$ resource subset includes M symbols, the symbols used to carry the DMRS in the $i^{th}$ resource subset include a second symbol and a second-to-last symbol in the M symbols, where M is a positive integer, and M≥2.

According to the apparatus for sending an uplink control channel in this embodiment of this application, when a specified format and a specified cyclic prefix are used for the uplink control channel, for each resource subset of the resource set for carrying the uplink control channel, at least two candidate symbol quantities can be used. The at least two candidate symbol quantities are possible quantities of symbols used to carry the DMRS in each resource subset. Therefore, in this embodiment of this application, a plurality of symbols used to carry the DMRS can exist in one resource subset, thereby meeting a requirement for demodulating the uplink control information and improving transmission reliability and accuracy of the uplink control channel.

For concepts related to the technical solution provided in this embodiment of this application for the apparatus 10, explanations and detailed descriptions of the concepts, and other steps, refer to descriptions of such content in the foregoing method or other embodiments. Details are not described herein again.

Figure 13:
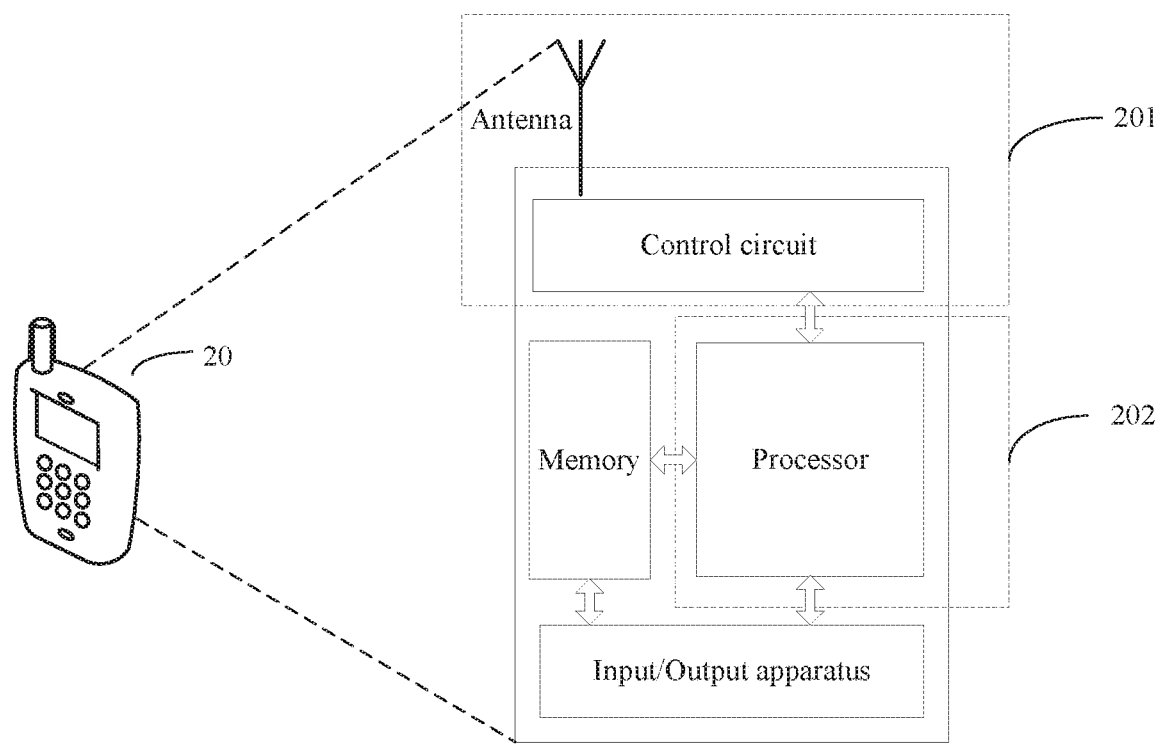
FIG. 13 is a schematic structural diagram of a terminal device according to an embodiment of this application.

FIG. 13 is a schematic structural diagram of a terminal device 20 according to this application. The terminal device 20 may be applied to the system shown in FIG. 1. For ease of description, FIG. 13 shows only main components of the terminal device. As shown in FIG. 13, the terminal device 20 includes a processor, a memory, a control circuit, an antenna, and an input/output apparatus.

The processor is mainly configured to process a communication protocol and communication data, control the entire terminal device, execute a software program, and process data of the software program, for example, configured to support the terminal device in performing actions described in the embodiment of the method for transmitting an indication of a precoding matrix. The memory is mainly configured to store a software program and data, for example, store a codebook described in the foregoing embodiments. The control circuit is mainly configured to perform conversion between a baseband signal and a radio frequency signal, and process a radio frequency signal. The control circuit and the antenna may be collectively referred to as a transceiver, mainly configured to receive or send a radio frequency signal in a form of an electromagnetic wave. The input/output apparatus, for example, a touchscreen, a display screen, or a keypad, is mainly configured to receive data input by a user and output data to the user.

After the terminal device is powered on, the processor can read a software program in a storage unit, interpret and execute an instruction of the software program, and process data of the software program. When data needs to be sent in a wireless manner, the processor performs baseband processing on the to-be-sent data and then outputs a baseband signal to a radio frequency circuit. The radio frequency circuit performs radio frequency processing on the baseband signal and then sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art can understand that, for ease of description, FIG. 13 shows only one memory and one processor. There may be a plurality of processors and memories in an actual terminal device. The memory may also be referred to as a storage medium, a storage device, or the like, and this is not limited in this embodiment of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 13 integrates functions of the baseband processor and the central processing unit. A person skilled in the art can understand that the baseband processor and the central processing unit may alternatively be independent processors interconnected to each other by using a technology such as a bus. A person skilled in the art can understand that the terminal device may include a plurality of baseband processors to adapt to different network standards, the terminal device may include a plurality of central processing units to enhance a processing capability of the terminal device, and various parts of the terminal device may be connected through various buses. The baseband processor may also be expressed as a baseband processing circuit or a baseband processing chip. The central processing unit may also be expressed as a central processing circuit or a central processing chip. The function of processing the communication protocol and the communication data may be built in the processor, or may be stored in a form of a software program in a storage unit, and the processor executes the software program to implement a baseband processing function.

For example, in this embodiment of this application, the antenna having sending and receiving functions and the control circuit may be considered as a transceiver unit 201 of the terminal device 20, and the processor having a processing function may be considered as a processing unit 202 of the terminal device 20. As shown in FIG. 13, the terminal device 20 includes the transceiver unit 201 and the processing unit 202. The transceiver unit may also be referred to as a transceiver device, a transceiver, a transceiver apparatus, or the like. Optionally, in the transceiver unit 201, a device configured to implement a receiving function may be considered as a receiving unit; and in the transceiver unit 201, a device configured to implement a sending function may be considered as a sending unit. In other words, the transceiver unit 201 includes a receiving unit and a sending unit. For example, the receiving unit may also be referred to as a receiver, a receiving device, a receiving circuit, or the like, and the sending unit may be referred to as a transmitter, a transmission device, a transmission circuit, or the like.

Figure 14:
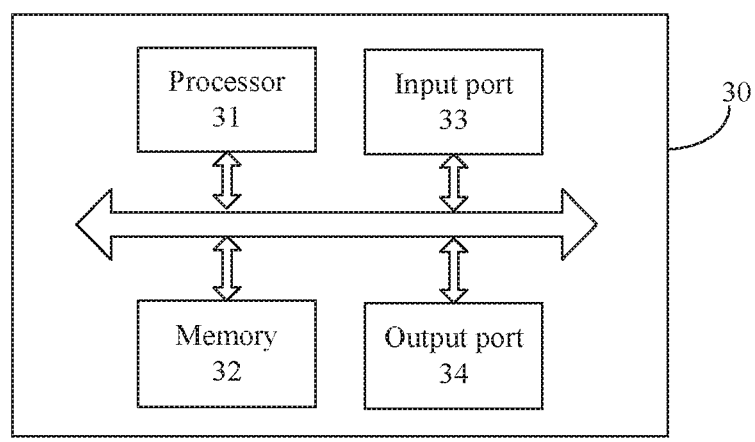
FIG. 14 is a schematic block diagram of an apparatus for receiving an uplink control channel according to an embodiment of this application.

According to the foregoing method, FIG. 14 is a schematic diagram 2 of an apparatus 30 for receiving an uplink control channel according to an embodiment of this application. As shown in FIG. 14, the apparatus 30 may be a network device (for example, the network device # A), or may be a chip or a circuit, for example, a chip or a circuit that may be disposed in a network device. The network device corresponds to the network device (for example, the network device # A) in the foregoing method.

The apparatus 30 may include a processor 31 (that is, an example of a processing unit) and a memory 32. The memory 32 is configured to store an instruction. The processor 31 is configured to execute the instruction stored in the memory 32, so that the apparatus 30 implements the steps performed by the network device (for example, the network device # A) in the corresponding method in FIG. 11.

Further, the apparatus 30 may include an input port 33 (that is, an example of a communications unit) and an output port 34 (that is, another example of a processing unit). Further, the processor 31, the memory 32, the input port 33, and the output port 34 may communicate with each other through an internal connection channel, to transmit a control signal and/or a data signal. The memory 32 is configured to store a computer program. The processor 31 may be configured to invoke the computer program from the memory 32 and execute the computer program, so as to control the input port 33 to receive a signal and control the output port 34 to send a signal, to complete the steps of the terminal device in the method 200. The memory 32 may be integrated in the processor 31, or may be separated from the processor 31.

The input port 33 is controlled to receive a signal, and the output port 34 is controlled to send a signal, to complete the steps of the network device in the foregoing method. The memory 32 may be integrated in the processor 31, or may be separated from the processor 31.

Optionally, if the apparatus 30 is a network device, the input port 33 is a receiver, and the output port 34 is a transmitter. The receiver and the transmitter may be a same physical entity or different physical entities. When the receiver and the transmitter are a same physical entity, they may be collectively referred to as a transceiver.

Optionally, if the apparatus 30 is a chip or a circuit, the input port 33 is an input interface, and the output port 34 is an output interface.

Optionally, if the apparatus 30 is a chip or a circuit, the apparatus 30 may not include the memory 32, and the processor 31 may read an instruction (code or a program) from a memory outside the chip to implement the functions of the network device in the corresponding method in FIG. 11.

In an implementation, functions of the input port 33 and the output port 34 may be implemented by using a transceiver circuit or a special-purpose transceiver chip. The processor 31 may be implemented by using a special-purpose processing chip, a special-purpose processing circuit, a special-purpose processor, or a general-purpose chip.

In another implementation, the network device provided in this embodiment of this application may be implemented by using a general-purpose computer. To be specific, the memory stores program code for implementing functions of the processor 31, the input port 33, and the output port 34, and the general-purpose processor executes the code in the memory to implement the functions of the processor 31, the input port 33, and the output port 34.

In this embodiment of this application, the processor 31 may be configured to determine a resource set, and determine, for each of N resource subsets included in the resource set, a quantity of symbols used to carry a DMRS, where the quantity of symbols is one of at least two candidate symbol quantities.

The input port 33 may be configured to receive the uplink control channel by using the resource set.

Optionally, the processor 31 is specifically configured to determine, based on a payload of the uplink control information and a size of a frequency domain resource corresponding to an $i^{th}$ resource subset in the N resource subsets, a quantity of symbols used to carry the DMRS for the $i^{th}$ resource subset, where i is any value in [1, N].

Optionally, the candidate symbol quantities include a first candidate quantity and a second candidate quantity, and the first candidate quantity is greater than the second candidate quantity; and the processor 31 is specifically configured to: when a ratio of the payload of the uplink control information to the size of the frequency domain resource corresponding to the $i^{th}$ resource subset is greater than or equal to a preset second threshold, determine the second candidate quantity as the quantity of symbols used to carry the DMRS in the $i^{th}$ resource subset.

Optionally, the second threshold is greater than or equal to 20, and the second threshold is less than or equal to 100.

Optionally, the processor 31 is specifically configured to determine, based on the size of the frequency domain resource corresponding to the $i^{th}$ resource subset, the payload of the uplink control information, and a size of a time domain resource corresponding to the $i^{th}$ resource subset, the quantity of symbols used to carry the DMRS for the $i^{th}$ resource subset.

Optionally, the candidate symbol quantities include a first candidate quantity and a second candidate quantity, and the first candidate quantity is greater than the second candidate quantity; and the processor 31 is specifically configured to: when a ratio of the payload of the uplink control information to the size of the frequency domain resource corresponding to the $i^{th}$ resource subset is less than or equal to a preset third threshold, and the size of the time domain resource corresponding to the $i^{th}$ resource subset is less than a preset fourth threshold, determine the second candidate quantity as the quantity of symbols used to carry the DMRS in the $i^{th}$ resource subset; or the processor 31 is specifically configured to: when a ratio of the payload of the uplink control information to the size of the frequency domain resource corresponding to the $i^{th}$ resource subset is less than or equal to a preset third threshold, and the size of the time domain resource corresponding to the $i^{th}$ resource subset is greater than or equal to a preset fourth threshold, determine the first candidate quantity as the quantity of symbols used to carry the DMRS in the $i^{th}$ resource subset.

Optionally, the third threshold is greater than or equal to 20, and the third threshold is less than or equal to 100.

The fourth threshold is 5 or 6.

Optionally, the output port 34 is configured to send first indication information to a terminal device, where the first indication information is used to indicate the quantity of symbols used to carry the DMRS in each resource subset.

Optionally, one resource subset is one frequency hopping part.

Optionally, when the quantity of symbols used to carry the DMRS in the $i^{th}$ resource subset is 1 and the $i^{th}$ resource subset includes M symbols, if M is an odd number, the symbols used to carry the DMRS in the $i^{th}$ resource subset include a $k^{th}$ symbol in the M symbols, where $k=(M+1)/2$; or when the quantity of symbols used to carry the DMRS in the $i^{th}$ resource subset is 1 and the $i^{th}$ resource subset includes M symbols, if M is an even number, the symbols used to carry the DMRS in the $i^{th}$ resource subset include a $k^{th}$ symbol in the M symbols, where $k=M/2\pm1$; or when the quantity of symbols used to carry the DMRS in the $i^{th}$ resource subset is 2 and the $i^{th}$ resource subset includes M symbols, the symbols used to carry the DMRS in the $i^{th}$ resource subset include a second symbol and a second-to-last symbol in the M symbols, where M is a positive integer, and M≥2.

According to the apparatus for receiving an uplink control channel in this embodiment of this application, when a specified format and a specified cyclic prefix are used for the uplink control channel, for each resource subset of the resource set for carrying the uplink control channel, at least two candidate symbol quantities can be used. The at least two candidate symbol quantities are possible quantities of symbols used to carry the DMRS in each resource subset. Therefore, in this embodiment of this application, a plurality of symbols used to carry the DMRS can exist in one resource subset, thereby meeting a requirement for demodulating the uplink control information and improving transmission reliability and accuracy of the uplink control channel.

The foregoing listed functions and actions of each module or unit in the apparatus 30 for receiving an uplink control channel are merely example descriptions. Each module or unit in the apparatus 30 may be configured to perform each action or processing process performed by the network device in the method 200. Herein, a detailed description thereof is omitted to avoid repetition.

For concepts related to the technical solution provided in this embodiment of this application for the apparatus 30, explanations and detailed descriptions of the concepts, and other steps, refer to descriptions of such content in the foregoing method or other embodiments. Details are not described herein again.

Figure 15:
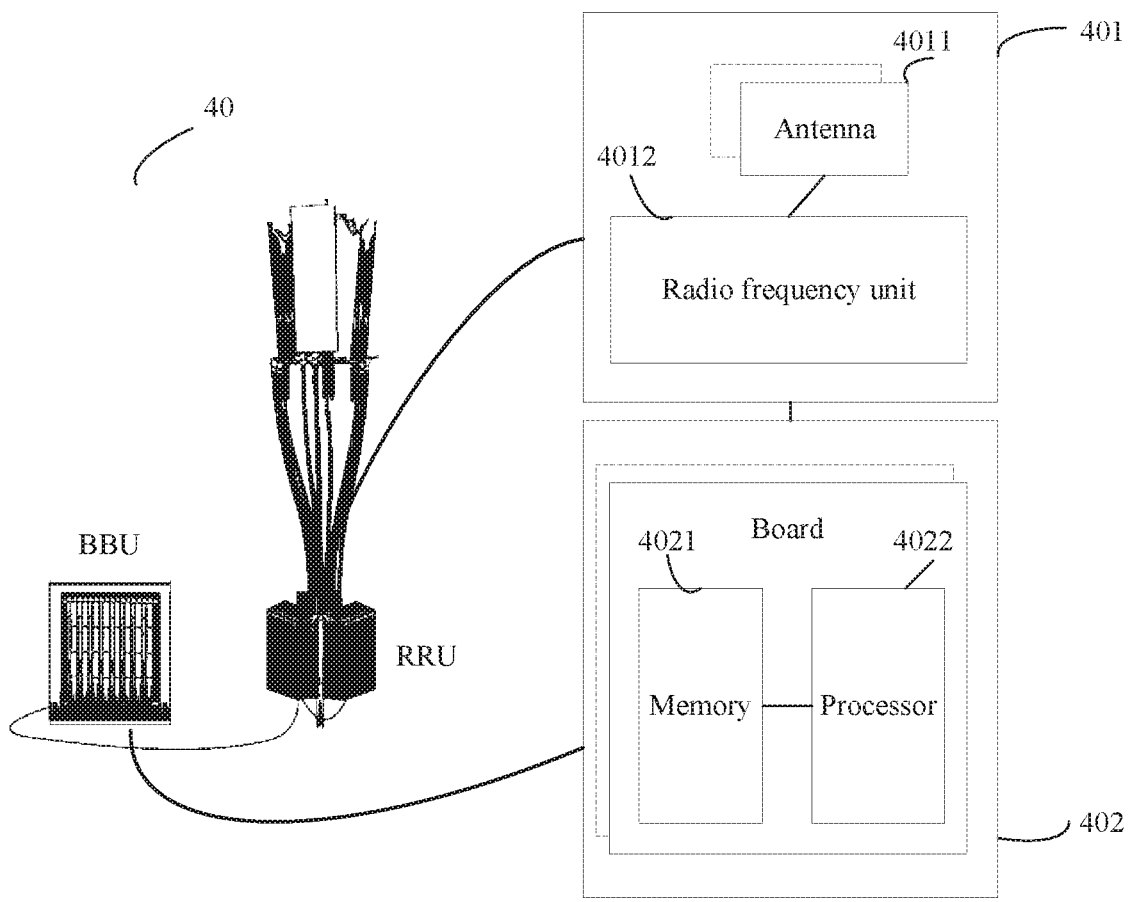
FIG. 15 is a schematic structural diagram of a network device according to an embodiment of this application.

FIG. 15 is a schematic structural diagram of a network device according to an embodiment of this application. The network device may be configured to implement functions of the network device in the foregoing method. For example, FIG. 15 may be a schematic structural diagram of a base station. As shown in FIG. 15, the base station may be applied to the system shown in FIG. 1. The base station 40 includes one or more radio frequency units, for example, a remote radio unit (RRU) 401, and one or more baseband units (BBU) (which may also be referred to as digital units, digital unit, DU) 402. The RRU 401 may be referred to as a transceiver unit, a transceiver, a transceiver circuit, a transceiver device, or the like, and may include at least one antenna 4011 and a radio frequency unit 4012. The RRU 401 is mainly configured to receive or send a radio frequency signal, and perform conversion between a radio frequency signal and a baseband signal, for example, configured to send a signaling message in the foregoing embodiments to a terminal device. The BBU 402 is mainly configured to perform baseband processing, control the base station, and the like. The RRU 401 and the BBU 402 may be physically integrated, or may be physically separated from each other to form a distributed base station.

As a control center of the base station, the BBU 402 may also be referred to as a processing unit, and is mainly configured to perform a baseband processing function, for example, channel encoding, multiplexing, modulation, and spectrum spreading. For example, the BBU (processing unit) 402 may be configured to control the base station 40 to perform an operation process related to the network device in the foregoing method embodiment.

In an example, the BBU 402 may include one or more boards. The plurality of boards may together support a radio access network of a single access standard (for example, an LTE system or a 5G system), or may separately support radio access networks of different access standards. The BBU 402 further includes a memory 4021 and a processor 4022. The memory 4021 is configured to store a necessary instruction and necessary data. For example, the memory 4021 stores a codebook and the like in the foregoing embodiments. The processor 4022 is configured to control the base station to perform a necessary action, for example, configured to control the base station to perform an operation process related to the network device in the foregoing method embodiment. The memory 4021 and the processor 4022 may serve one or more boards. In other words, a memory and a processor may be disposed on each board. Alternatively, a plurality of boards may share a same memory and a same processor. In addition, a necessary circuit may be disposed on each board.

In a possible implementation, with development of a system-on-chip (SoC) technology, all or some functions of the BBU 402 and the RR U 401 may be implemented by using the SoC technology, for example, implemented by using one base station function chip. The base station function chip integrates components, such as a processor, a memory, and an antenna interface; the memory stores a program for a related function of the base station; and the processor executes the program to implement the related function of the base station. Optionally, the base station function chip can also read a memory outside the chip to implement a related function of the base station.

It should be understood that the base station structure shown as an example in FIG. 15 is only a possible form, and should not be construed as any limitation on this embodiment of this application. This application does not exclude a possibility that a base station structure of another form may emerge in the future.

Based on the method provided in the embodiment of this application, an embodiment of this application further provides a communications system. The communications system includes the foregoing network device and one or more terminal devices.

It should be understood that the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, all or some of the processes or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes should be determined according to functions and internal logic of the processes, and should not be construed as any limitation on the implementation processes in the embodiments of this application.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It can be clearly understood by a person skilled in the art that, for convenience and brevity of description, for a detailed working process of the foregoing systems, apparatuses, and units, reference may be made to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, the unit division is merely logical function division, and there may be another division manner in actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separated, and parts shown as units may or may not be physical units, that is, may be located in one position, or may be distributed on a plurality of network units. Some or all of the units may be selected according to actual needs to achieve the objectives of the solutions of the embodiments. In addition, functional units in the embodiments of this application may be integrated into one processing unit, or each unit may exist alone physically, or two or more units may be integrated into one unit. When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining a resource set to be used for an uplink control channel, wherein the uplink control channel carries uplink control information and a demodulation reference signal (DMRS), the resource set comprises N resource subsets, each of the N resource subsets comprises a plurality of consecutive symbols in time domain, and N is a positive integer greater than or equal to 1;
   determining, for each of the N resource subsets, a quantity of symbols used to carry the DMRS, wherein the quantity of symbols used to carry the DMRS is one of at least two candidate symbol quantities; and
   sending the uplink control channel by using the resource set, wherein:
      when the quantity of symbols used to carry the DMRS in the $i^{th}$ resource subset is 1 and the $i^{th}$ resource subset comprises M symbols, if M is an odd number, the symbols used to carry the DMRS in the $i^{th}$ resource subset comprise a $k^{th}$ symbol in the M symbols, wherein k=(M+1)/2; or
      when the quantity of symbols used to carry the DMRS in the $i^{th}$ resource subset is 2 and the $i^{th}$ resource subset comprises M symbols, the symbols used to carry the DMRS in the $i^{th}$ resource subset comprise a second symbol and a second-to-last symbol in the M symbols,
      M is a positive integer, and M≥2.

2. The method according to claim 1, wherein the determining, for each of the N resource subsets, a quantity of symbols used to carry the DMRS comprises:
   determining, for each of the N resource subsets based on a payload of the uplink control information, the quantity of symbols used to carry the DMRS.

3. The method according to claim 1, wherein the determining, for each of the N resource subsets, a quantity of symbols used to carry the DMRS comprises:
   receiving first indication information, wherein the first indication information is used to indicate the quantity of symbols used to carry the DMRS in each resource subset; and determining, for each resource subset based on the first indication information, the quantity of symbols used to carry the DMRS.

4. The method according to claim 1, wherein one resource subset is one frequency hopping part.

5. The method according to claim 1, wherein a format of the uplink control channel is a first format, a length of a cyclic prefix CP used for the uplink control channel is a first CP length, and the at least two candidate symbol quantities correspond to the first format and the first CP length.

6. An apparatus, comprising:
   a processor, configured to determine a resource set to be used for an uplink control channel, wherein the uplink control channel carries uplink control information and a demodulation reference signal (DMRS), the resource set comprises N resource subsets, each of the N resource subsets comprises a plurality of consecutive symbols in time domain, and N is a positive integer greater than or equal to 1; and determine, for each of the N resource subsets, a quantity of symbols used to carry the DMRS, wherein the quantity of symbols used to carry the DMRS is one of at least two candidate symbol quantities; and
   a transceiver, configured to send the uplink control channel by using the resource set, wherein:
      when the quantity of symbols used to carry the DMRS in the $i^{th}$ resource subset is 1 and the $i^{th}$ resource subset comprises M symbols, if M is an odd number, the symbols used to carry the DMRS in the $i^{th}$ resource subset comprise a $k^{th}$ symbol in the M symbols, wherein k=(M+1)/2; or when the quantity of symbols used to carry the DMRS in the $i^{th}$ resource subset is 2 and the $i^{th}$ resource subset comprises M symbols, the symbols used to carry the DMRS in the $i^{th}$ resource subset comprise a second symbol and a second-to-last symbol in the M symbols, M is a positive integer, and M≥2.

7. The apparatus according to claim 6, wherein the processor is specifically configured to determine, for each of the N resource subsets based on a payload of the uplink control information, the quantity of symbols used to carry the DMRS.

8. The apparatus according to claim 6, wherein the transceiver is further configured to receive first indication information, wherein the first indication information is used to indicate the quantity of symbols used to carry the DMRS in each resource subset, and the processor is specifically configured to determine, for each resource subset based on the first indication information, the quantity of symbols used to carry the DMRS.

9. The apparatus according to claim 6, wherein one resource subset is one frequency hopping part.

10. The apparatus according to claim 6, wherein a format of the uplink control channel is a first format, a length of a cyclic prefix CP used for the uplink control channel is a first CP length, and the at least two candidate symbol quantities correspond to the first format and the first CP length.

11. A non-transitory computer readable storage medium storing a program that, when executed by a computer, causes the computer to execute a communication method, and the method comprises:

determining a resource set to be used for an uplink control channel, wherein the uplink control channel carries uplink control information and a demodulation reference signal (DMRS), the resource set comprises N resource subsets, each of the N resource subsets comprises a plurality of consecutive symbols in time domain, and N is a positive integer greater than or equal to 1;

determining, for each of the N resource subsets, a quantity of symbols used to carry the DMRS, wherein the quantity of symbols used to carry the DMRS is one of at least two candidate symbol quantities; and sending the uplink control channel by using the resource set, wherein:

when the quantity of symbols used to carry the DMRS in the $i^{th}$ resource subset is 1 and the $i^{th}$ resource subset comprises M symbols, if M is an odd number, the symbols used to carry the DMRS in the $i^{th}$ resource subset comprise a $k^{th}$ symbol in the M symbols, wherein k=(M+1)/2; or when the quantity of symbols used to carry the DMRS in the $i^{th}$ resource subset is 2 and the $i^{th}$ resource subset comprises M symbols, the symbols used to carry the DMRS in the $i^{th}$ resource subset comprise a second symbol and a second-to-last symbol in the M symbols, M is a positive integer, and M≥2.

12. The non-transitory computer readable storage medium according to claim 11, wherein the determining, for each of the N resource subsets, a quantity of symbols used to carry the DMRS comprises:

determining, for each of the N resource subsets based on a payload of the uplink control information, the quantity of symbols used to carry the DMRS.

13. The non-transitory computer readable storage medium according to claim 11, wherein the determining, for each of the N resource subsets, a quantity of symbols used to carry the DMRS comprises:

receiving, first indication information, wherein the first indication information is used to indicate the quantity of symbols used to carry the DMRS in each resource subset; and determining, for each resource subset based on the first indication information, the quantity of symbols used to carry the DMRS.

14. The non-transitory computer readable storage medium according to claim 11, wherein one resource subset is one frequency hopping part.

15. A method for receiving an uplink control channel, comprising:

determining, by a network device, a resource set to be used for an uplink control channel, wherein the uplink control channel carries uplink control information and a demodulation reference signal DMRS, the first resource set comprises N resource subsets, each of the N resource subsets comprises a plurality of consecutive symbols in time domain, and N is a positive integer greater than or equal to 1;

determining, by the network device for each of the N resource subsets, a quantity of symbols used to carry the DMRS, wherein the quantity of symbols of the DMRS is one of at least two candidate symbol quantities; and receiving, by the network device, the uplink control channel by using the resource set, wherein:

when the quantity of symbols used to carry the DMRS in the ith resource subset is 1 and the ith resource subset comprises M symbols, if M is an odd number, the symbols used to carry the DMRS in the ith resource subset comprise a kth symbol in the M symbols, wherein k=(M+1)/2; or when the quantity of symbols used to carry the DMRS in the ith resource subset is 2 and the ith resource subset comprises M symbols, the symbols used to carry the DMRS in the ith resource subset comprise a second symbol and a second-to-last symbol in the M symbols, M is a positive integer, and M≥2.

16. The method according to claim 15, wherein the method further comprises:

sending, by the network device, first indication information to a terminal device, wherein the first indication information is used to indicate the quantity of symbols used to carry the DMRS in each resource subset.

17. The method according to claim 15, wherein one resource subset is one frequency hopping part.

18. An apparatus, comprising:

one or more processors; and one or more memories coupled to the one or more processors and storing programming instructions for execution by the one or more processors to cause the apparatus to perform a method comprising:

determining, by a network device, a resource set to be used for an uplink control channel, wherein the uplink control channel carries uplink control information and a demodulation reference signal DMRS, the first resource set comprises N resource subsets, each of the N resource subsets comprises a plurality of consecutive symbols in time domain, and N is a positive integer greater than or equal to 1;

determining, by the network device for each of the N resource subsets, a quantity of symbols used to carry the DMRS, wherein the quantity of symbols of the DMRS is one of at least two candidate symbol quantities; and receiving, by the network device, the uplink control channel by using the resource set, wherein:

when the quantity of symbols used to carry the DMRS in the ith resource subset is 1 and the ith resource subset comprises M symbols, if M is an odd number, the symbols used to carry the DMRS in the ith resource subset comprise a kth symbol in the M symbols, wherein $k=(M+1)/2$; or when the quantity of symbols used to carry the DMRS in the ith resource subset is 2 and the ith resource subset comprises M symbols, the symbols used to carry the DMRS in the ith resource subset comprise a second symbol and a second-to-last symbol in the M symbols, M is a positive integer, and $M \geq 2$.

19. The method according to claim 18, wherein the method further comprises:

sending, by the network device, first indication information to a terminal device, wherein the first indication information is used to indicate the quantity of symbols used to carry the DMRS in each resource subset.

20. The method according to claim 18, wherein one resource subset is one frequency hopping part.

* * * * *